United States Patent [19]
Trebbi et al.

[11] Patent Number: 5,581,975
[45] Date of Patent: Dec. 10, 1996

[54] AUTOMATIC MACHINE FOR FILLING AND CLOSING FLASKS OR THE LIKE CONTAINERS

[75] Inventors: Claudio Trebbi, Medicina; Gianfranco Salmi, Bologna, both of Italy

[73] Assignee: I.M.A. Industria Macchine Automatiche S.p.A., Bologna, Italy

[21] Appl. No.: 357,229

[22] Filed: Dec. 12, 1994

[30] Foreign Application Priority Data

Dec. 24, 1993 [IT] Italy .................. BO93A0526

[51] Int. Cl.⁶ .................. B65B 3/28; B65B 37/18; B65B 7/28
[52] U.S. Cl. .................. 53/284.6; 53/282; 53/300; 53/502
[58] Field of Search .................. 53/281, 282, 201, 53/300, 368, 502, 55, 284.6; 198/470.1, 803.7, 803.9

[56] References Cited

U.S. PATENT DOCUMENTS

| | | | |
|---|---|---|---|
| 1,912,677 | 6/1933 | Williams | 53/300 |
| 1,993,092 | 3/1935 | Ferro | 53/281 |
| 2,987,313 | 6/1961 | Bjering et al. | 53/300 X |
| 3,309,836 | 3/1967 | Hallowell, Jr. | 53/282 X |
| 3,527,017 | 9/1970 | Taylor et al. | 53/282 X |
| 3,975,260 | 8/1976 | Peyton et al. | |
| 4,109,446 | 8/1978 | Krohn et al. | 53/282 |
| 4,363,649 | 12/1982 | Yamato et al. | |
| 4,939,890 | 7/1990 | Peronek et al. | 53/300 X |
| 4,984,680 | 1/1991 | Hamano | 198/803.9 |
| 5,014,491 | 5/1991 | Tsukada et al. | 53/282 X |
| 5,402,623 | 4/1995 | Ahlers | 53/281 X |

FOREIGN PATENT DOCUMENTS

| | | |
|---|---|---|
| 0005402 | 11/1979 | European Pat. Off. |
| 0366225 | 5/1990 | European Pat. Off. |
| 0486439 | 5/1992 | European Pat. Off. |
| 2340796 | 5/1974 | Germany. |
| 3713016 | 10/1988 | Germany. |

*Primary Examiner*—Horace M. Culver
*Attorney, Agent, or Firm*—Larson and Taylor

[57] ABSTRACT

All the carousels of the machine are provided with grippers for holding the flasks. A carousel with grippers (6) for holding the flask by the neck is followed by a carousel with grippers (7) for holding the flask by the body and so on. Between the jaws of each gripper there is provided in the middle region a vertical opposition element (35) fixed onto a horizontal slide (36) supported by the gripper body (33) and connected to a mechanism which modify the position of the said opposition element according to the diameter of the flasks. The opposition element is directed towards the flask with a concave-profile front face. The orbits (29, 30) along which the grippers of two consecutive carousels travel intersect each other in the zone where the flasks pass from one carousel to the other. In this zone the flask is immediately held between the opposition elements of the opposite grippers of the carousels, which open and close alternately. The opposition elements of one of the two consecutive carousels are spring-mounted. Preferably the opposition elements of the grippers of the operating carousels are immobile and the opposition elements of the grippers of the service carousels are spring-mounted. Special variable-profile cams control the transfer of the flasks between the carousels of the machine.

20 Claims, 16 Drawing Sheets

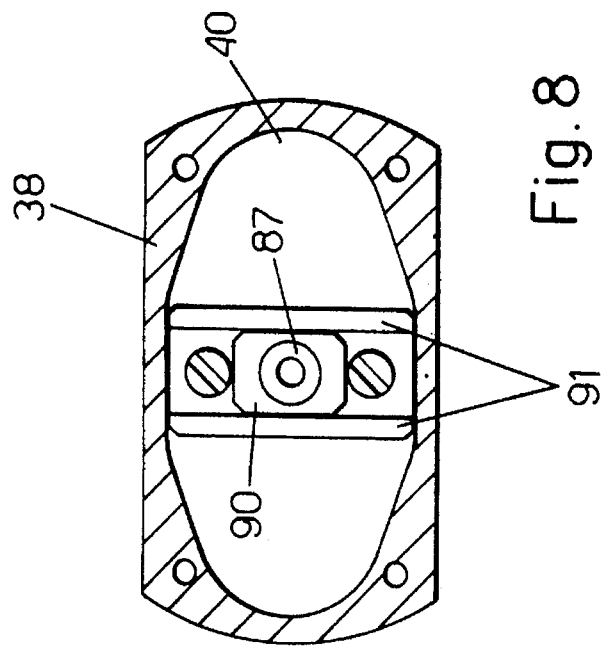
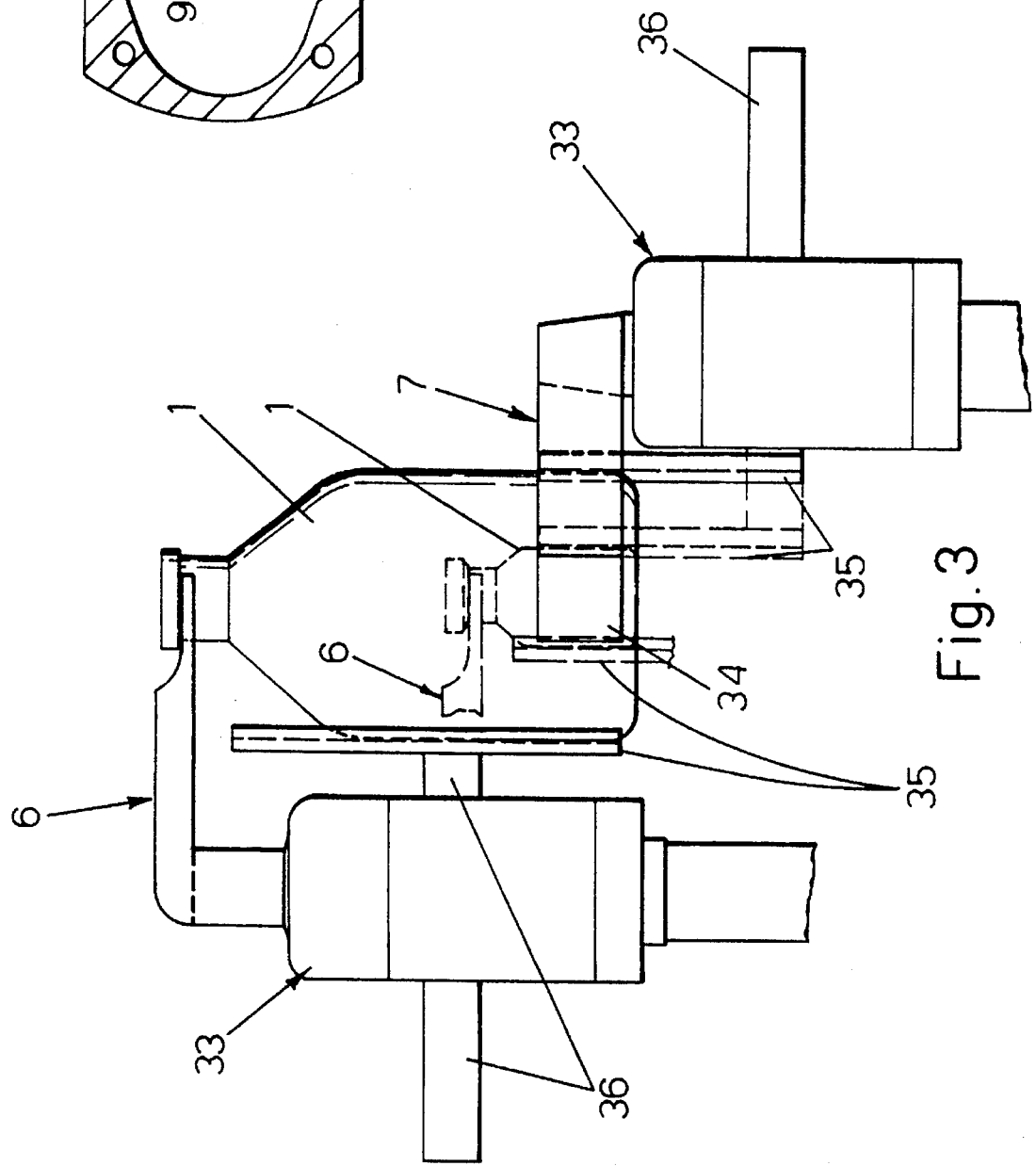

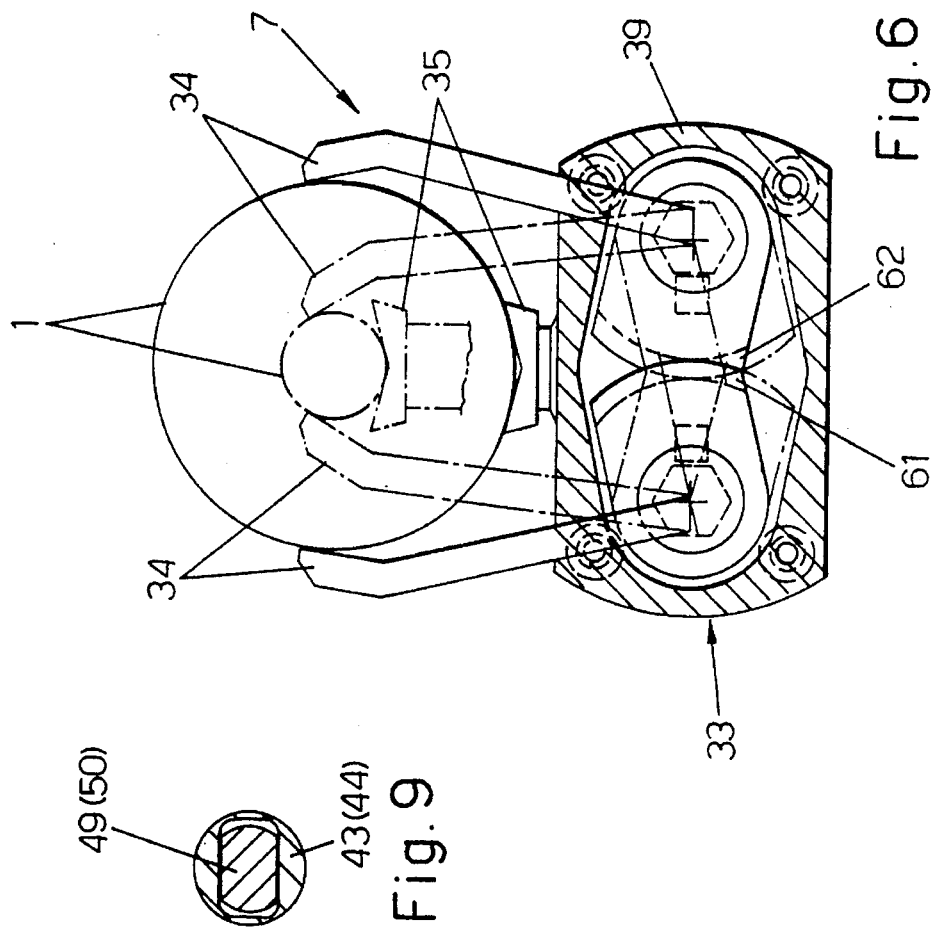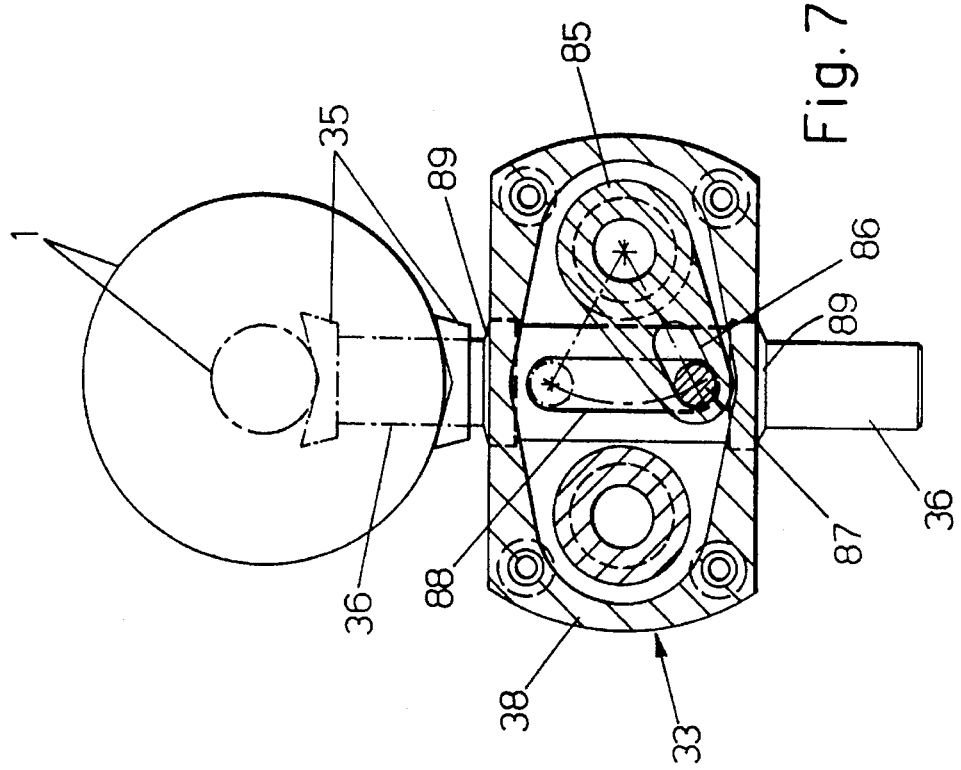

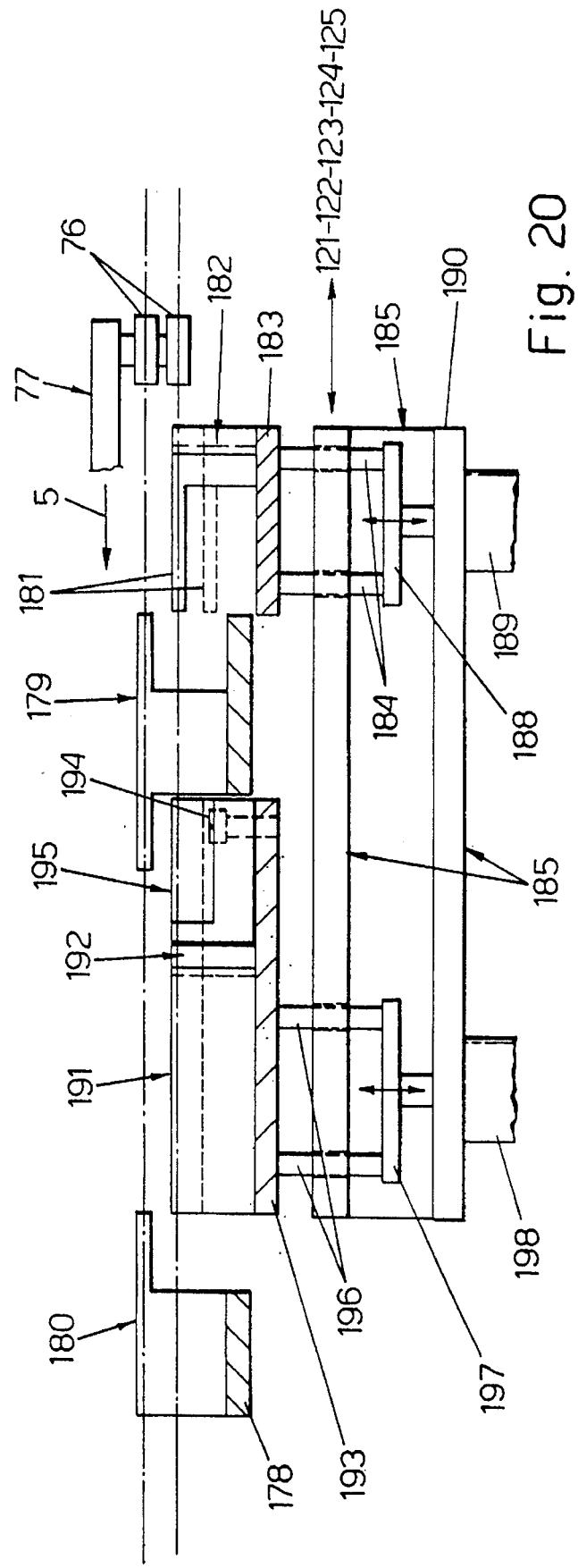

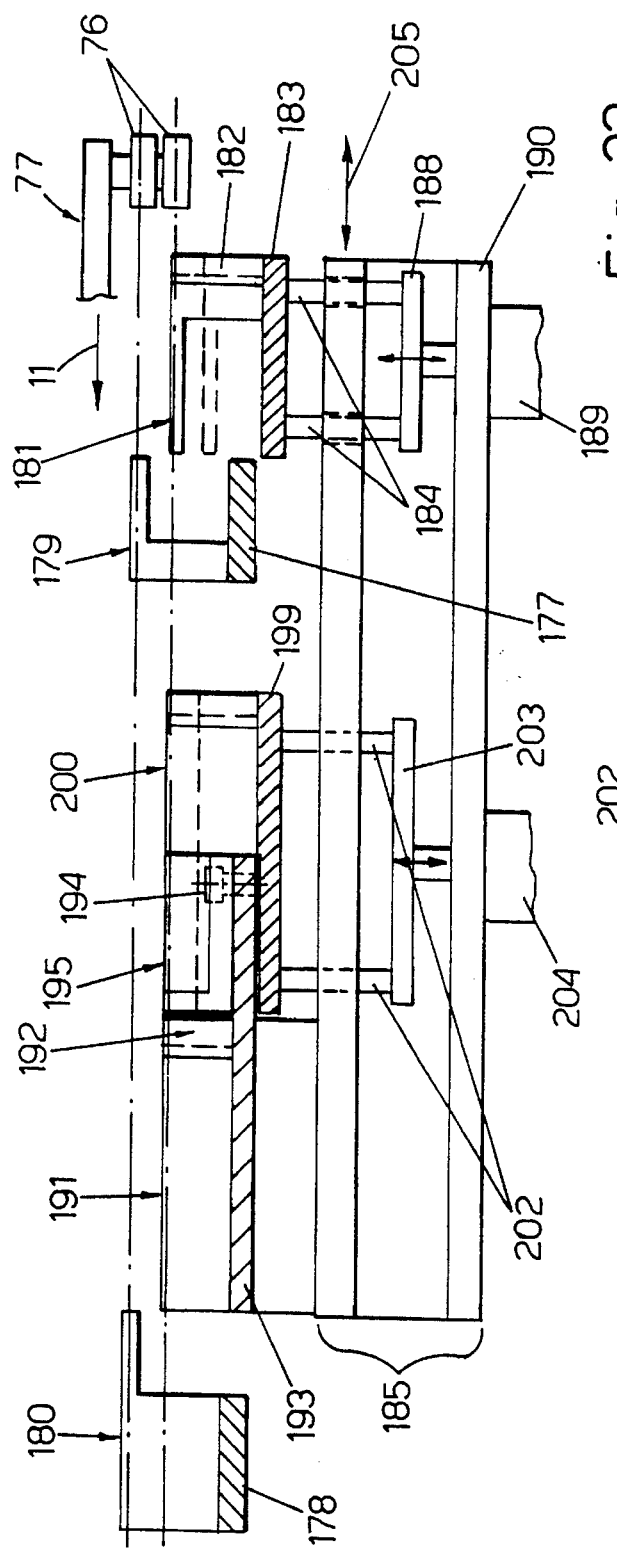
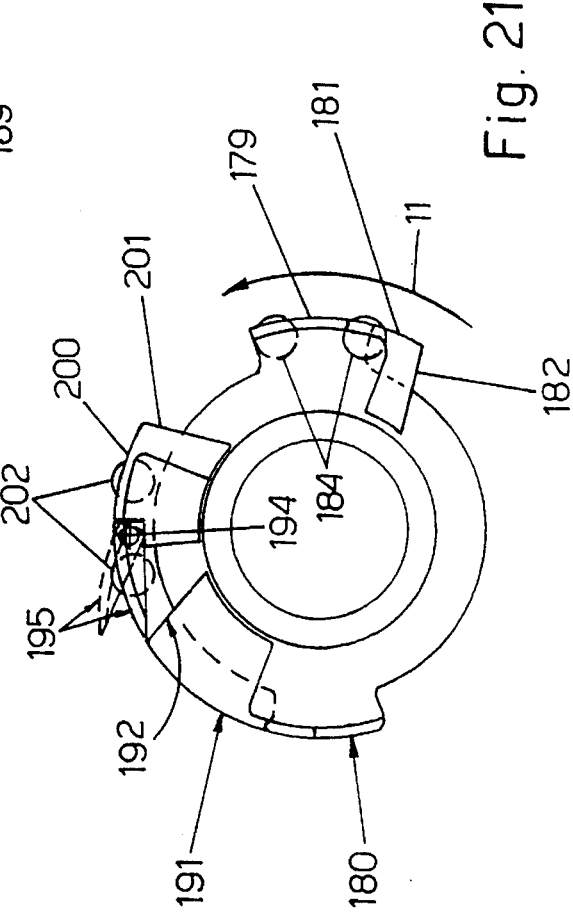
Fig. 22
Fig. 21

5,581,975

1

AUTOMATIC MACHINE FOR FILLING AND CLOSING FLASKS OR THE LIKE CONTAINERS

BACKGROUND AND SUMMARY OF THE INVENTION

The present invention relates to an automatic machine with a high production output and great degree of operational flexibility, used for filling and closing flasks or other containers.

Flask filling and sealing machines formed by a succession of carousels are known, some of these carousels being provided with grippers for holding the flasks, while others are of the so-called star-type with perimetral alcoves into which the flasks themselves fit snugly. In the case of star-type carousels, the star devices must be replaced when there is a variation in the size of the flasks, and the flasks themselves rub against fixed parts guiding and retaining the actual flasks inside the alcoves of the star devices.

The invention aims to overcome this first drawback with a machine formed by a succession of carousels, all provided with grippers which alternately grip the flasks by the neck and by the body. In the main carousels where filling and sealing is performed, the flasks are gripped by the body so that their top part is completely free for the operating means and is in the best possible state for receiving any flow of gases which ensure hygienic or sterile conditions for packaging of the product inside the said flasks.

In machines of the known type, where cooperation between two carousels with grippers may be necessary, the grippers of a carousel are operated so as to be able to oscillate in advance or with a delay on an axis parallel to that of the carousel itself, so as to follow over a sufficiently long section the orbit on which the grippers of another carousel are moving and so as to have a sufficient amount of time for the opening and closing operations, even in the case of high peripheral speeds of the carousels. This solution involves constructional complications, in particular on account of the adjustments which are necessary when there is a variation in the size of the flasks.

According to the invention, this drawback is overcome in that the grippers are mounted on the carousels in a fixed radial arrangement and the orbits along which the grippers of consecutive carousels move intersect each other. Between the jaws of each gripper, in the middle position, there is provided a vertical opposition element which acts on the body of the flask and which is directed towards the latter with a concave self-centering profile. Moreover, the opposition elements of the grippers of a carousel, preferably the operating carousels, are immobile and the opposition elements of the grippers of the other carousels are mobile against the action of elastic means. During the transfer of a flask from one carousel to another, the flask itself is gripped, on opposite portions of its body, by the opposition elements of the grippers of the two carousels, such that the grippers themselves are able to alternate safely during opening and closing. With grippers thus designed, the flask remains permanently pressed, with its body, against the opposition element of the gripper which retains it by the neck or body, ensuring greater positional stability of the flask itself.

This solution is suitable for being able to handle a wide range of flask sizes, without having to effect major replacements of parts of the machine. Via the machine's control panel it is possible to perform automatic adjustment of the position of the opposition elements and the advance and delay in the opening sequence of the grippers and all those adjustments which are necessary when there is a variation in the size of the flasks being processed.

BRIEF DESCRIPTION OF THE DRAWINGS

These and other features of the machine in question, and the advantages resulting therefrom, will emerge more clearly from the following description of a preferred embodiment of the machine, illustrated purely by way of a non-limiting example in the figures of the drawings, in which:

FIG. 3 is a side elevation view of a pair of grippers of two consecutive carousels during transfer of a flask from one gripper to the other;

FIGS. 6, 7, 8 and 9 illustrate the constructional details of the mechanism shown in FIG. 5, sectioned along the lines VI—VI, VII—VII, VIII—VIII and IX—IX, respectively;

FIG. 20 is a schematic view, extending in a planar direction, of the profile of the cam according to FIGS. 18 and 19;

FIG. 21 is a plan view of the cam which controls opening and closing of the grippers in the second transfer carousel;

FIG. 22 is a schematic view, extending in a planar direction, of the profile of the cam according to FIG. 21.

DESCRIPTION OF THE PREFERRED EMBODIMENT OF THE INVENTION

Figure 1:
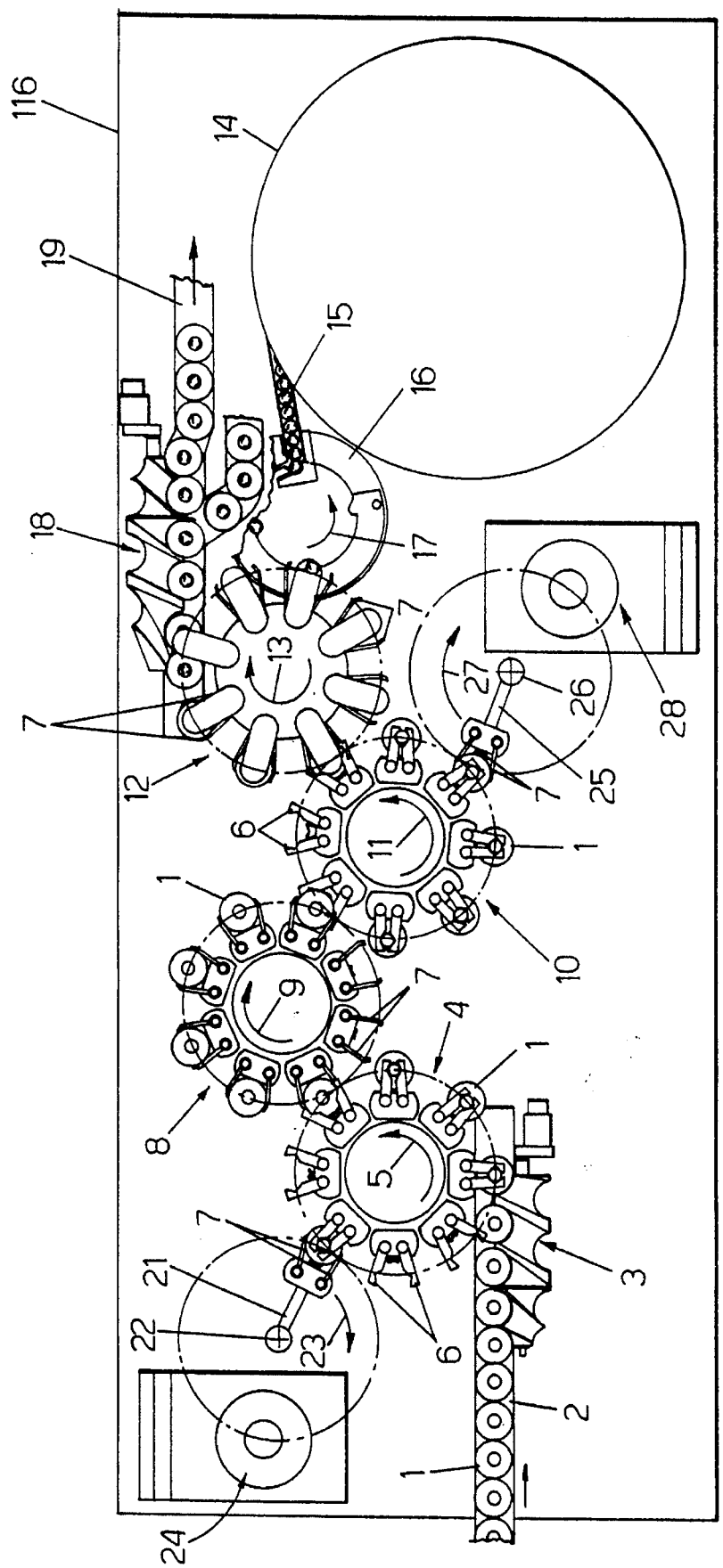
FIG. 1 is a schematic plan view, from above, of the machine version suitable for packaging flasks of cosmetic, pharmaceutical or medicinal products.

From FIG. 1 it can be seen that the empty flasks 1 are conveyed in single file by a conveyor 2 to a known twin-augur intercepting device 3 which with its helical screw engages with the line of moving flasks and separates and feeds them in a synchronised manner to a following vertical-axis carousel 4 which rotates in the direction of the arrow 5 and which is provided with equidistant grippers 6 arranged so as to grip the flasks by the neck. The augur intercepting device 3, the carousel 4 and all the other components of the machine which must operate in synchronization with each other are actuated by a single driving source. The empty flasks, which are transported by the grippers of the first transfer carousel 4, are transferred in a synchronised manner to the grippers 7 of a vertical-axis carousel 8 which rotates in the direction indicated by the arrow 9 and with which means for introducing into the flasks metered amounts of fluid products are associated. The grippers 7 grip the flasks by their body. The flasks filled with product by the filling carousel 8 are transferred from the latter to the neck-holding grippers 6 of a second vertical-axis transfer carousel 10, similar to the carousel 4, which rotates in the direction of the arrow 11 and which transfers said flasks to the body-holding grippers 7 of a following vertical-axis carousel 12 which rotates in the direction of the arrow 13 and which seals the flasks with a stopper. 14 denotes the loader inside which the stoppers are stored loosely and which aligns the stoppers in single file along a line 15, in a predetermined direction. Loader 14 feeds them to a small vertical-axis transfer carousel 16 which rotates in the direction of the arrow 17 and which transfers the stoppers themselves in a synchronised manner to the stations of the sealing carousel 12. The full and sealed flasks are transferred from the sealing carousel 12 by a transfer means of a known type also provided, for example, with a twin augur, as described in the separate patent application in the name of the Applicant. Transfer means 18 sort the flasks themselves onto two conveyor lines 19 and 20, depending on whether or not the flasks themselves are correctly filled and/or correctly sealed.

The flasks transported by the first transfer carousel 4, using a statistical control method are periodically checked for their tare weight and the flasks, during subsequent transportation by the second transfer carousel 10, are checked for their gross weight, so as to verify via special processing means whether or not the weight of the packaged product is within the permitted limits. As a result of this verification, it is possible to correct, if necessary, operation of the metering devices functioning within the filling carousel or to stop the machine in the case of serious discrepancies. The flasks whose tare weight must be statistically checked are removed from the first transfer carousel 4. The flask which must be weighed is not transferred to the filling carousel, but is retained by the gripper 6 of the carousel 4 and is rapidly taken hold of, in a synchronised manner, by the body-holding gripper 7 of an arm 21 which rotates on the vertical shaft 22, in the direction of the arrow 23 and which transfers the flask onto an electronic weighing unit 24. In a synchronised manner this flask is then re-introduced into the transfer carousel 4 and when the station of this carousel passes opposite feeder means 3, the latter will have left a space unfilled so that the flask is able to continue towards the next filling carousel 8 on to which it will be transferred. For this purpose the feeder means 3 may be constructed in accordance with Italian Patent Application No. B093A 000488 (or EP-A-065 6305) in the name of the same Applicant. The means 7, 21, 22, 23 will also be referred to below as the carousel of the first weighing unit. The flasks whose tare weight have been checked are subsequently removed, during transfer onto the second transfer carousel 10, by a body-holding gripper 7 associated with an arm 25 rotating on the vertical shaft 26, in the direction of the arrow 27, which transfers the flask itself to a second weighing unit 28. The parts 7, 25, 26, 27 will also be referred to below as: the carousel of the second weighing unit. After the gross weight has been recorded, the flask is re-introduced into a gripper of the transfer carousel 10, which is empty as a result of a flask not being transferred from the first transfer carousel 4 to the filling carousel 8. The units 28 and 24 are connected to a processing unit which transmits the necessary information to the electronic microprocessor unit which controls operation of the machine via the aforementioned logic system.

During the entire working cycle, the flasks are retained by the grippers, as a result of which the following advantages may be obtained:

- the flasks do not rub against fixed parts, as occurs in the case of star-type transfer carousels, thus avoiding the formation of particles which could contaminate the packaged product inside the flasks;
- with the grippers it is possible to handle a range of flasks of widely varying dimensions, without having to perform manual replacement or adjustment operations, as explained in greater detail below;
- in the filling carousel and sealing carousel, the flasks are held by their body so that their top part is completely free and accessible for the means which are required to perform introduction of the product and subsequent sealing. The mouth of the flasks is moreover in the optimum condition for being enveloped by the flow of cleaning and/or sterilising gases which are circulated inside the chamber 116 which houses the various parts of the machine described with reference to FIG. 1, in the case where the machine itself is intended for the packaging of medicinal, pharmaceutical or cosmetic products.

Figure 2:
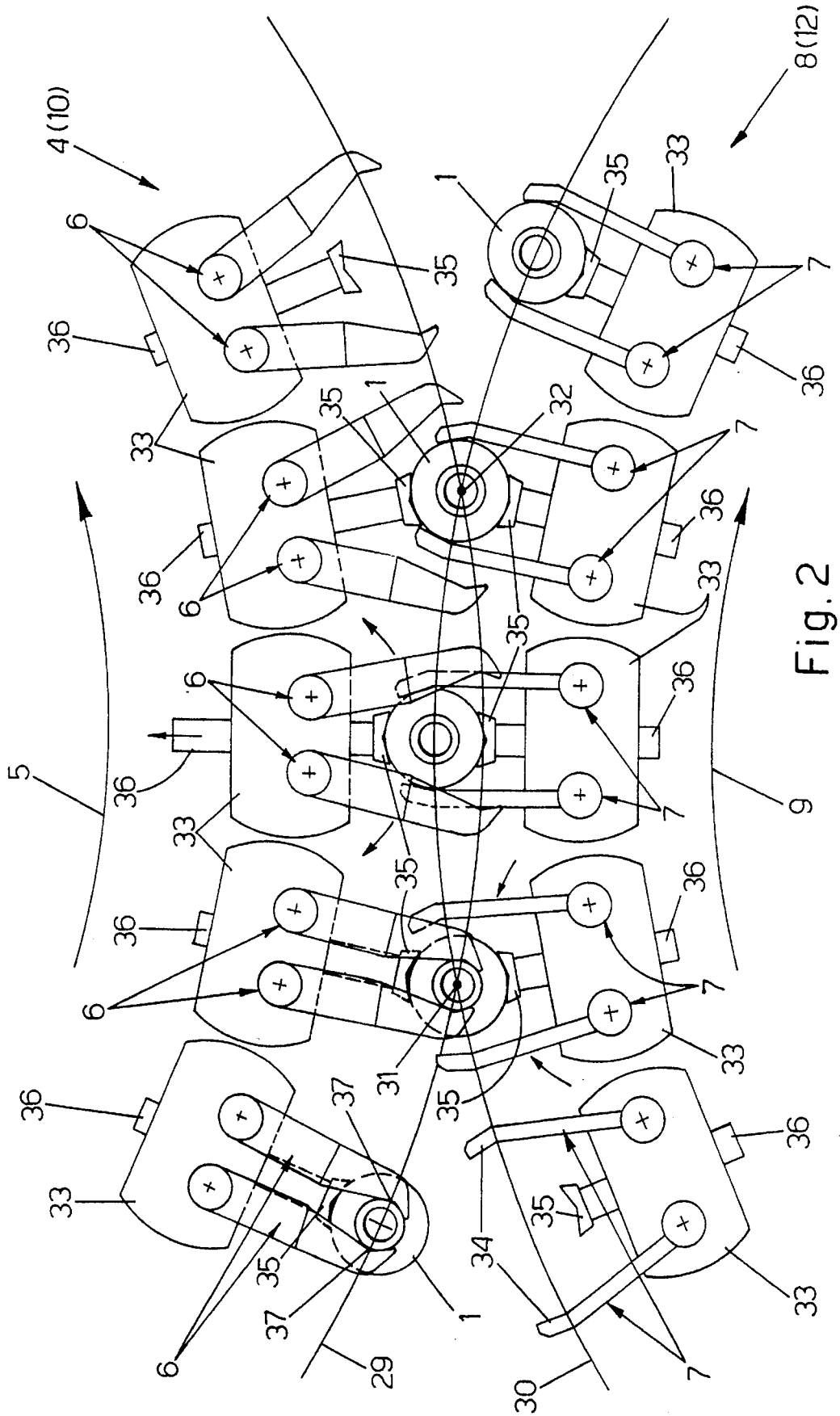
FIG. 2 is a plan view, from above, of the operating sequence of the grippers of two consecutive carousels, during transfer of a flask from one carousel to another, in particular from a transfer carousel to an operating carousel.

From FIG. 2 it can be seen that the flasks carried by the grippers of a carousel, for example by the grippers 6 of the transfer carousel 4 (or 10), travel along an orbit 29 which intersects the orbit 30 travelled by the flasks of the following carousel, for example the filling carousel 8 (or the sealing carousel 12), at the points denoted by 31 and 32, corresponding to the ends of arcs of circles which are sufficiently long and in the middle region are situated at a distance from one another which is much smaller than that shown since the radius of the aforementioned orbits is in reality much greater than that shown in the drawings. The bodies 33 of the carousel grippers remain in a fixed radial direction with respect to the carousels, namely the mid-plane with respect to which the jaws of the grippers perform symmetrical opening and closing movements remains fixed and is radially arranged with respect to each carousel. The grippers 7 for holding the flasks by their body (see also FIG. 3) are provided with jaws having a flat shape and a height such that they are able to embrace a sufficiently high section of the flasks themselves and terminate with sections 34 which are bent inwards and, where necessary, lined with shock-resistant material and which, during closing, push the flask so as to adhere to the concave face of a vertical opposition element 35 which has a V-shaped profile in plan view and is equidistant from the jaws of the gripper and fixed to the end of a horixontal slide 36 which passes through the middle part of the body 33 of the said grippers and which is radially arranged with respect to the carousel. It is not excluded that the active face of the opposition element 35 may also be advantageously lined with shock-resistant material. The flasks controlled by the filling carousel 8, the sealing carousel 12 and the two carousels of the weighing units 24, 28 are supported substantially in three zones of the same annular band, located at the vertices of a hypothetical equilateral or isosceles triangle.

The grippers 6 for holding the flask by the neck are provided with horizontal flat end parts having concave facing zones 37 on its inner sides. The grippers 6 are also provided with a vertical opposition element 35 which is similar to that of the grippers 7 described above and also cooperates with the flask body. From FIG. 3 it can be seen that the opposition element 35 of the grippers 6 is such that, even during the handling of large-size flasks, the opposition elements 35 of the grippers 6 and 7 of two consecutive carousels have opposite portions which engage with the same annular band of the flask body.

Means, described below, are provided for modifying the distance of the opposition element 35 from the body 33 of the grippers when there is a variation in size of the flasks.

Means are also provided such that the position of the opposition elements 35 of the grippers 7, once established, remains fixed and such that the position of the opposition elements 35 of the grippers 6 may, on the other hand, be modified in the vicinity of the gripper body 33, against the action of an elastic means which tends to bring the opposition element itself back into the position which normally corresponds to the size of the flask being processed.

With reference to FIG. 2 which, from left to right, shows the working sequence of the grippers when a flask passes from a transfer carousel 4 or 10 to the filling carousel 8 or to the sealing carousel 12 or to one of the two carousels of the two weighing units 24, 28 (FIG. 1), it can be seen that a gripper 6 meets up, closed around the flask 1, with a gripper 7 which, on the other hand, is open. At the point of intersection 31 of the orbits 29, 30, the flask is still held by the gripper 6 and its body is in contact with the facing opposition elements 35 of the gripper 6 and gripper 7. The gripper 7 is made to close and the gripper 6 to open and, during this phase, the grippers have all the necessary space available to reach the second intersection point 32 of the orbits 29, 30, during which the flask is firmly held by the opposition elements 35 and passes from the orbit 29 to the orbit 30, owing to the possibility of spring-loaded retraction of the opposition element 35 of the gripper 6. All of this clearly ensures safe operation, even in the case of a high peripheral speed of the carousels.

Figure 4:
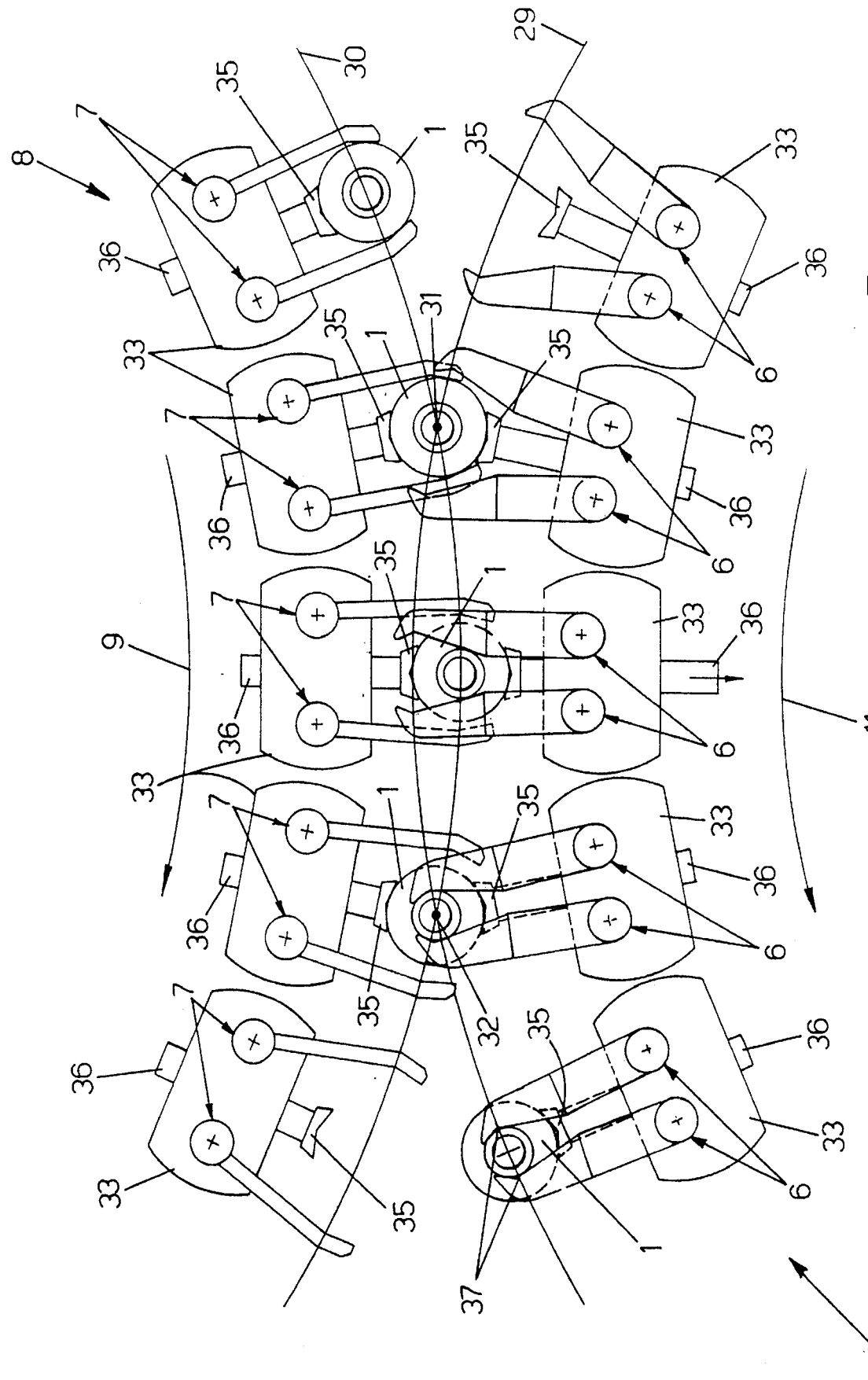
FIG. 4 is a plan view, from above, of the operating sequence of the grippers during transfer of one flask from an operating carousel to a transfer carousel.

FIG. 4 shows, from right to left, the sequence for the transfer of a flask from one carousel with grippers 7 and a fixed opposition element 35 to a carousel with grippers 6 and a spring-mounted opposition element 35. Following the direction of rotation of the two carousels, it can be seen that the flask held by a gripper 7 and travelling along the orbit 30 intersects, at 31, the orbit 29 of the grippers 6 and at this point cooperates with an open gripper 6, while the body of the flask cooperates with the opposition elements 35 of the two grippers. When passing from the entry intersection point 31 to the exit intersection point 32 of the orbits 30, 29, the flask remains along the orbit 30 owing to the elastic reaction of the opposition element 35 of the gripper 6 and, in a synchronised manner, the jaws of the gripper 7 open, while those of the gripper 6 close. The pressure which the opposition element 35 of the grippers 6 exerts on the body of the flask will obviously be such that it does not damage the flask. Before leaving the point 32, after which the flask will have been definitively transferred into the orbit 29 of the carousel to which it is being transferred, the neck of the flask itself will cooperate with the concave zone 37 of the discontinuously shaped inner sides of the gripper 6 to which the flask itself will be firmly secured, also owing to the fact that the corresponding body rests against the opposition element 35 of this gripper, which, at the point 32, reaches the position where it is fully most extended from the corresponding gripper body 33.

Figure 5:
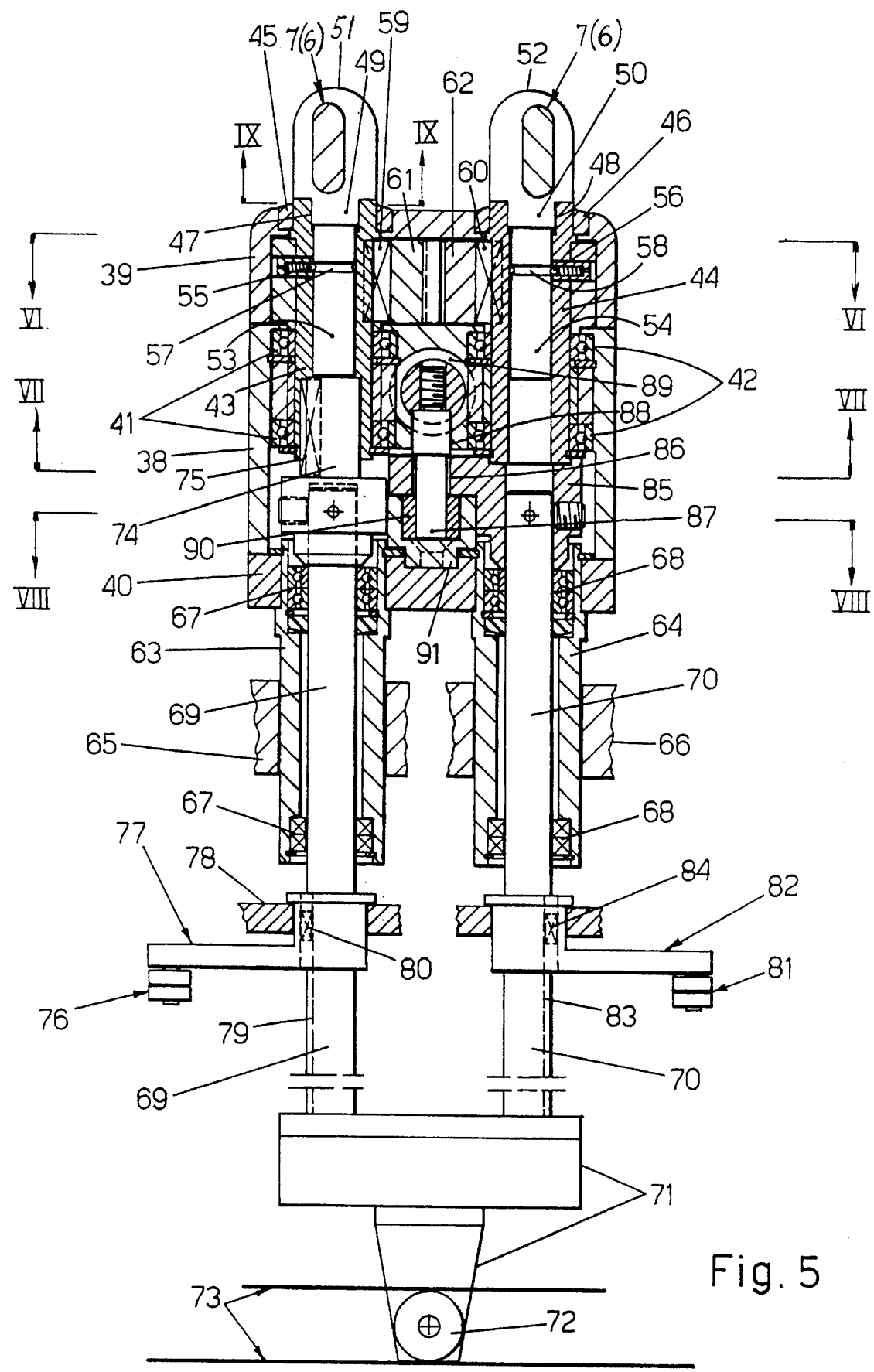
FIG. 5 is a front view, with parts sectioned, of a mechanism with gripper and opposition element of any one of the machine carousels.

With reference to FIGS. 5, 6 and 7, it can be seen that the body 33 of the grippers is formed by an intermediate part 38 closed at the top and the bottom by covers 39, 40 fixed with suitable ties. The part 38 supports rotatably, by means of pairs of bearings 41, 42, hollow and vertical spindles 43, 44 which project from the top cover 39 via openings lined with gaskets 45, 46. The upper end parts 47, 48 of the cavity of these spindles have a cross-section with one or more flat surfaces, as per the detail of FIG. 9, into which there may be inserted and keyed the upper portions 49, 50, with a matching cross-section, of the shanks of the heads 51, 52 which carry the jaws of the grippers 6 or 7 described above. The shanks 53, 54 of the gripper-carrying heads have a round cross-section and fit precisely into the hollow spindles 43, 44 where they are retained axially by the snap-engagement cooperation of their annular recesses 57, 58 with the spring-mounted spheres 55, 56 mounted on the spindles. Inside the cover 39, the spindles 43, 44 have keyed to them, by means of cotters 59, 60, respective toothed segments 61, 62 which mesh with each other, as per the detail of FIG. 6, so as to synchronise the opening and closing movement of the jaws of the grippers 6 or 7.

Figure 17:
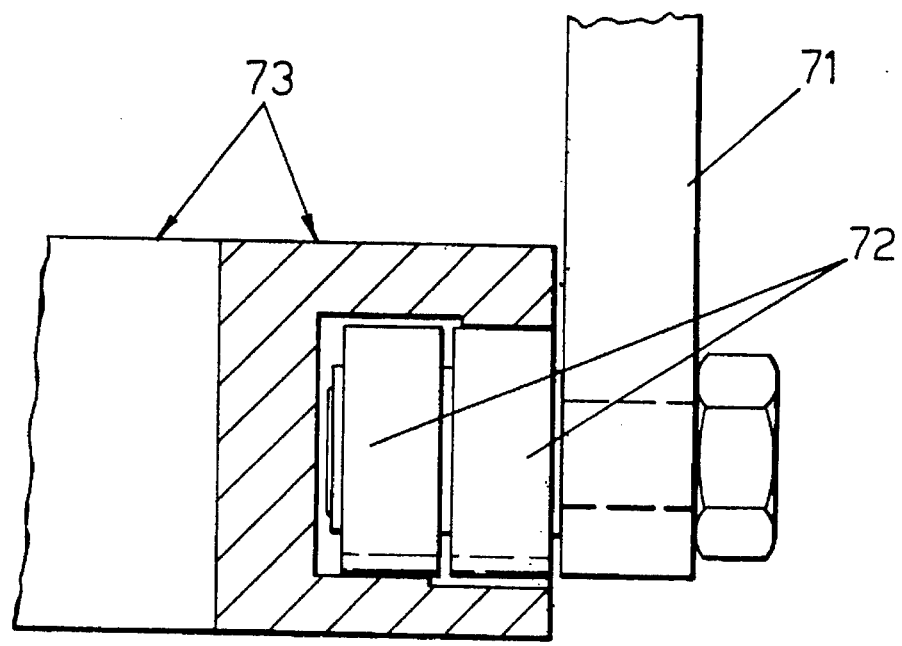
FIG. 17 is a view, on a larger scale and with parts sectioned, of a detail relating to the double-acting cam which controls and, where necessary, modifies the heightwise position of the grippers of the various carousels forming the machine.

The bottom cover 40 of the body 33 of each gripper has fixed to it the top end of a pair of vertical tubes 63, 64 which are axially aligned with the spindles 43, 44 and which slide, axially guided, inside parts 65, 66 of the carousel body, described in more detail below, so as to allow, where necessary, the raising and lowering movements of the jaws (see below). Inside the tubes 63, 64, there are rotatably mounted, by means of end bearings 67, 68, shafts 69, 70 which with a section of larger diameter project at the bottom from the said tubes and are fixed at their bottom end, via bearings, to a carriage 71 which with its own pair of wheels 72 rests and slides on the opposite surfaces of an annular double-acting cam 73 coaxially arranged in the carousel and shown more clearly in the detail of FIG. 17.

The shaft 69 enters into the body 33 of the gripper where it is fixed to a hub 74 which in turn is inserted and keyed by means of the cotter 75 inside the bottom end of the spindle 43. Suitable oscillation of the shaft 69 causes opening and closing of the jaws of the gripper 6 or 7 associated with the heads 51, 52. This oscillation is achieved by the cooperation, with a suitable cam coaxially arranged in the carousel and not visible in FIG. 5, of the end rollers 76 of a lever 77, the hub of which is rotatably supported by a part 78 of the carousel body and has passing through it axially the shaft 69 which longitudinally has at least one groove 79 for keying to the corresponding cotter 80 of the hub. It remains understood that keying between the hub of the lever 77 and the shaft 69 may be achieved in a different manner with a so-called splined-shaft coupling.

In the same way the shaft 70 derives an oscillating movement from a cam coaxially arranged in the carousel, not shown in FIG. 5, with which the end rollers 81 of a lever 82 cooperate, the hub of the latter being rotatably supported by the part 78 of the carousel body and having passing through it the shaft 70 provided with at least one longitudinal groove 83 for keying to the corresponding cotter 84 of the hub. In this case also, keying between the hub of the lever 82 and the shaft 70 may be achieved in a different manner with a coupling consisting of splined shafts allowing relative movements in the axial direction. On the top end of the'shaft 70, which projects inside the part 38 of the gripper body 33, there is fixed a crank 85. Crank 85, as can be seen from the detail of FIG. 7, is provided with a longitudinal eyelet 86 which cooperates with the middle part with a round cross-section of a vertical pin 87. Pin 87 passes through a slot 88 provided in the part 38 of the gripper body and is fixed via its top end to the horizontal stem 36 which slides inside a hole with bush 89 formed in the said part 38, which projects from the gripper body radially with respect to the carousel and which has on its end the opposition element 35. The bottom end of the pin 87 cooperates with a sliding block 90 which slides inside a guide 91 with a U-shaped profile (FIG. 8) located underneath the crank 85 and fixed to the bottom cover 40. This arrangement ensures actuation of the opposition element 35 associated with the grippers 7 for holding the flask by the body. For operation of the opposition element 35 associated with the grippers 6 for holding the flask by the neck, on the other hand, a special flute-tip front coupling, described below, is provided between the hub of the lever 82 and the associated shaft 70.

Figure 10:
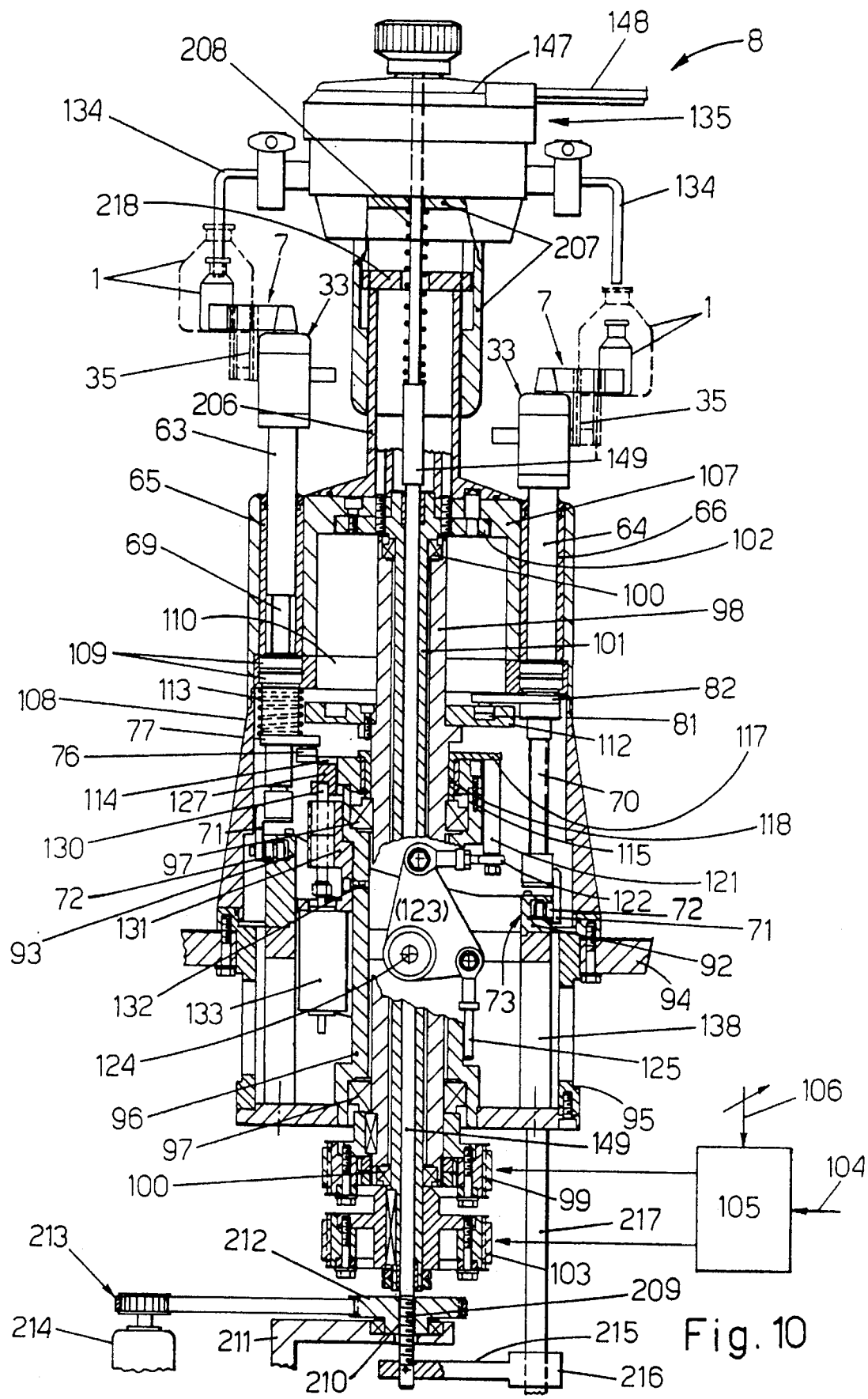
FIG. 10 is a side view, with parts sectioned, of the flask filling carousel.

With reference to FIG. 10, the filling carousel 8 is now described in detail. On a support surface 94 there is fixed the upper and flanged edge of a cup-shaped structure 95 which, with its bottom edge, supports in a coaxial position a hollow column 96. Column 96 suitably emerges from the structure 95 and which by means of end bearings 97 rotatably supports internally a coaxial tube 98. Tube 98 which projects by a suitable amount from the top part of the column and also from the bottom part of the latter, where it has keyed on it a toothed pulley 99 connected to a suitable driving source (see below). The tube 98, referred to below as the external tube, supports rotatably inside it, by means of end bearings 100, a tube 101, referred to below as the internal tube. Tube 101 supports above the external tube a flange 102 and supports below the tube a toothed pulley 103. The pulleys 103 and 99 are connected to the main driving source 10 of the machine, with the arrangement in between of any suitable known device 105 which allows the two tubes to be phase-adjusted, i.e. advanced or delayed, via a driving means 106. The pulleys 99 and 103, once phase-adjustment has been performed, rotate in the same direction and at the same speed.

Figure 11:
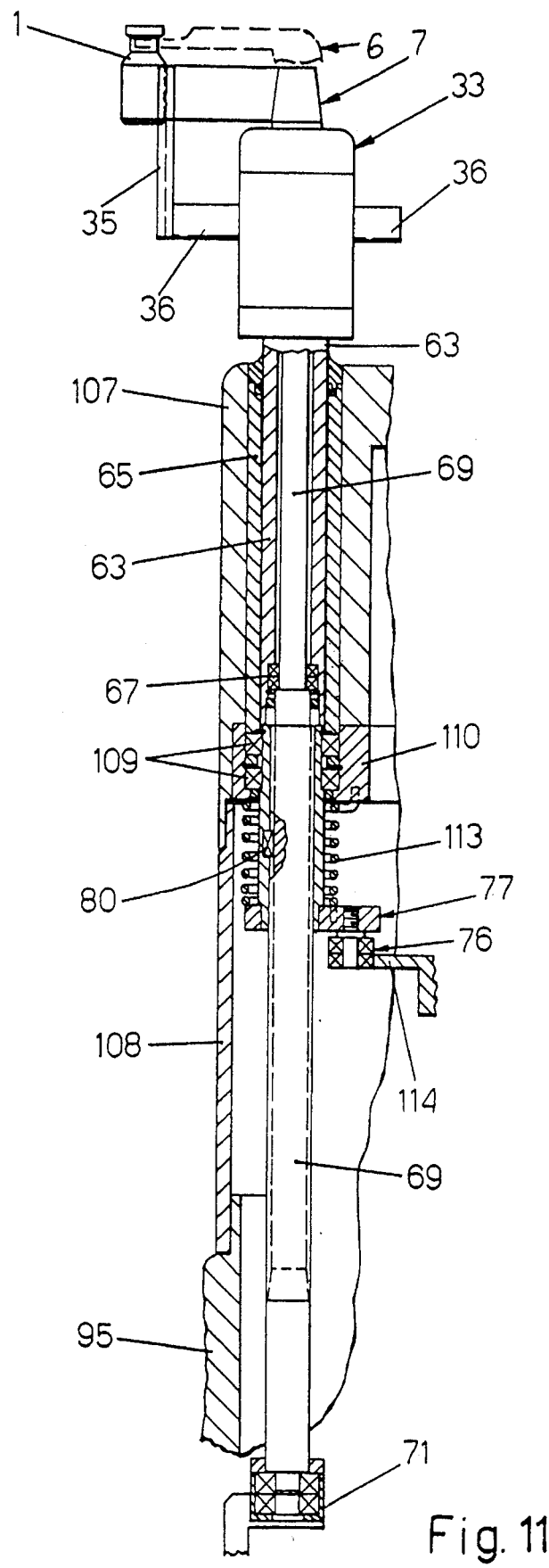
FIG. 11 is a side view, on a larger scale and with parts sectioned, of the actuating system for opening and closing the grippers of the carousels.
Figure 12:
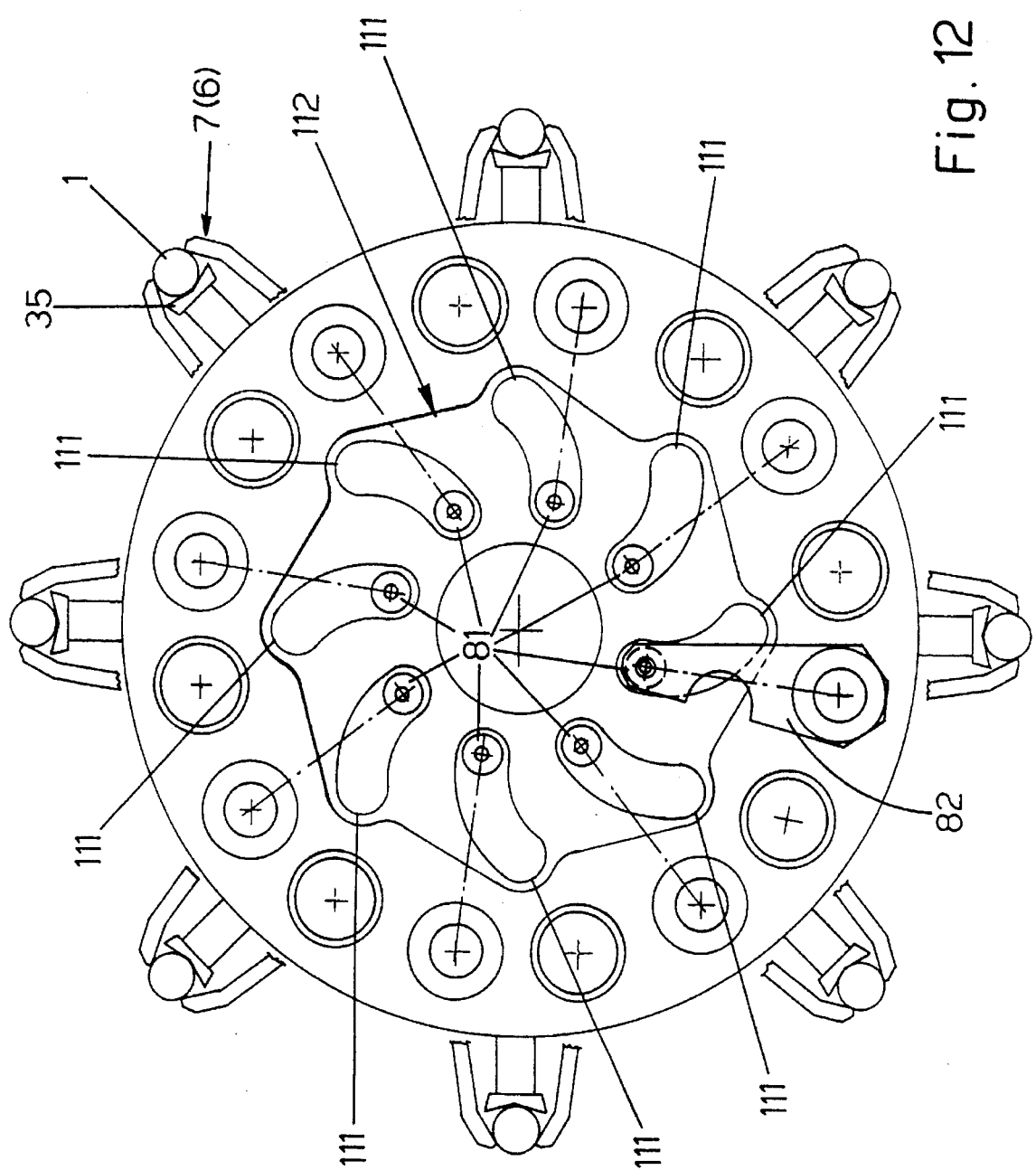
FIG. 12 is a plan view of the cam and driving elements for positioning of the opposition elements of the grippers, which varies according to the size of the flasks being processed.

On the flange 102 of the internal tube there is fixed coaxially the roof of a cylindrical bell-shaped structure 107 which with its bottom edge extends to within a short distance of a tubular body 108 fixed to the structure 95 and which encloses the various internal mechanisms of the carousel. This body 108 may advantageously be composed of several parts so that it can be removed in order to facilitate any extraordinary maintenance of the carousel. On the periphery of the structure 107 there are formed pairs of vertical and equidistant holes. These holes contain linings 65, 66 of material with a low coefficient of friction, inside which there axially slide the tubes 63, 64 which each carry at the top a gripper body 33, as already described with reference to FIG. 5. FIG. 10 shows on the left-hand side the mechanism with the shaft 69 which effects opening and closing of a gripper, while on the right-hand side it shows the mechanism with the shaft 70 which modifies the position of the opposition element 35 of the grippers. The hub of the levers 77, 82 which cause oscillation of the aforementioned shafts 69, 70, is mounted via bearings, as illustrated in the detail of FIG. 11 relating to the lever 77, inside an annular structure 110 arranged coaxially and fixed to the bottom edge of the bell-shaped structure 107. The rollers 81 of the levers 82 cooperate with the eyelets 111, arranged radially and angularly equidistant, of a cam 112 fixed coaxially on a middle flange of the external tube 98, illustrated in detail in FIG. 12. With a variation in the size of the flasks, the driving means 106 of FIG. 10 is actuated, resulting in phase-displacement of the tubes 101 and 98, such that the cam 112 rotates in the direction and with the angular displacement necessary for the position of the opposition element 35 of the grippers to be adapted to the size of the flasks.

From FIGS. 10 and 11 it can be seen that the hub of the levers 77 is longer than that of the levers 82 since it is surrounded by a needle spring 113 which biases the rollers 76 of the levers in question so as to adhere to the profile of a cam 114 fixed at 115 to the top of the hollow column 96 and which determines the opening and closing movement of the grippers. Considering FIG. 4 again, it can be seen that opening of the grippers 7 must be advanced or delayed according to the dimensions of the flask, since this variable modifies the position of the jaws of the grippers with respect to the point of intersection 31 of the orbits 30 and 29 of the filling carousel with the following transfer carousel 10. From FIG. 1 it can be seen, moreover, that the grippers of the filling carousel 8, when they cooperate with the first transfer carousel 4, must normally close in order to grip a flask, but periodically they must remain open in order to allow an empty flask to pass towards the means which transfer it subsequently to the weighing unit 24. In order to satisfy this requirement, provision has been made for that which is now described with reference to FIG. 10 and the details of FIG. 13. 9 denotes the direction of rotation of the carousel 8. The fixed cam 114 cooperates with the lower roller of the pair of rollers 76 associated with each lever 77. Above the cam 114 there is provided another flat cam 117 with which the upper roller of the rollers 76 of the levers 77 is able to cooperate and this cam is provided with a collar 118 mounted rotatably inside a corresponding seat of the fixed cam. When the upper cam 117 is rotated in an anti-clockwise direction when viewing FIG. 13, the face 119 of the latter moves away from that face 120 of the fixed cam, with a corresponding advance in opening of the levers 77 an the grippers 7. For rotation it is envisaged that the cam 117 should have fixed at the bottom a vertical rod 121 connected to a tie 122 with spherical joints, which in turn is articulated with the end of a right-angled lever 123 pivotably hinged at 124 laterally with the column 96 and connected at the other end to a transmission element 125 oriented for example downwards and connected to a servo control device, not shown, for example of the screw and nut type, which is electrically operated and may be remotely operated via the machine's control panel.

Figure 13:
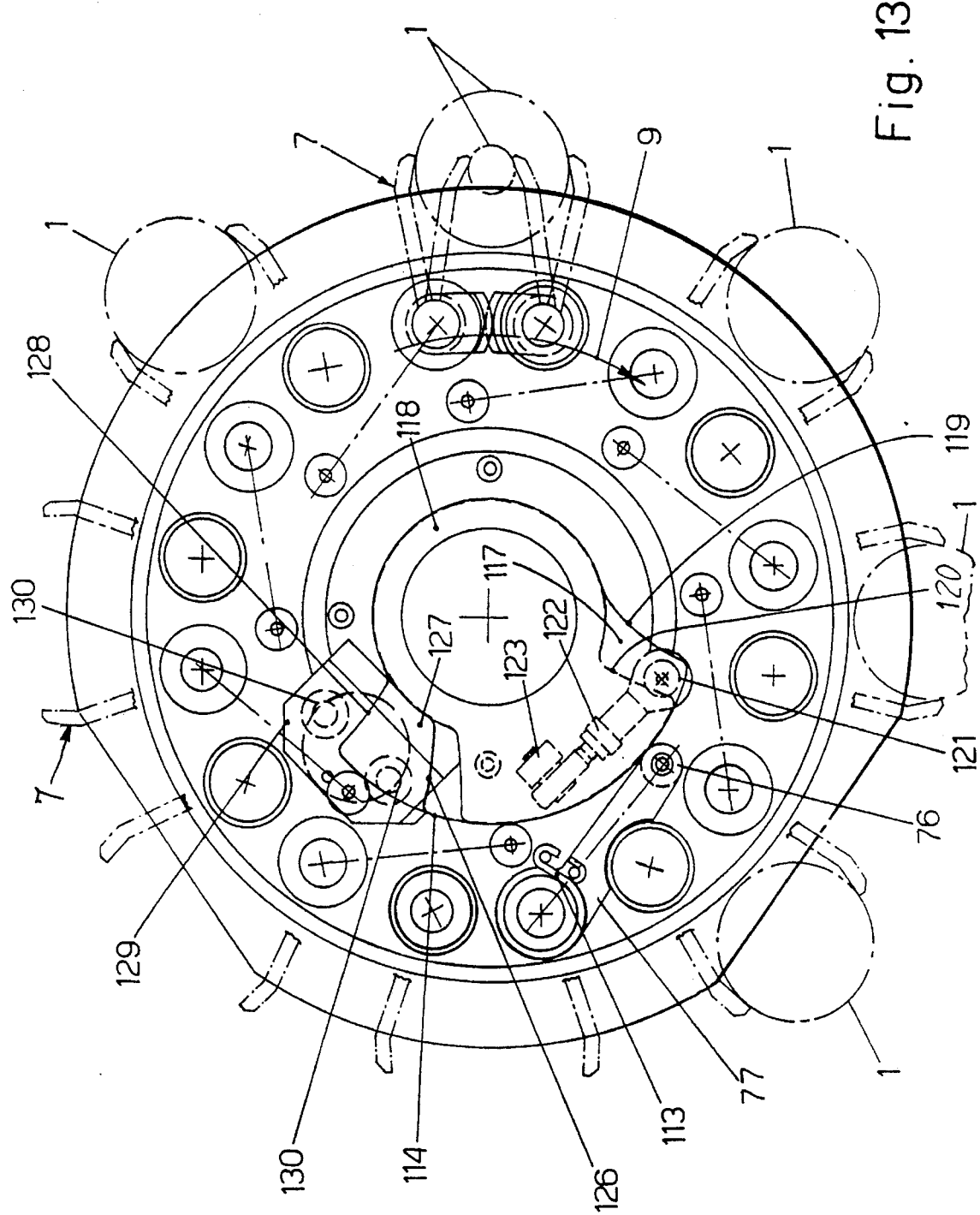
FIG. 13 is a plan view of the cam and driving elements for controlling opening and closing of the grippers of the flask filling carousel or sealing carousel.

From FIG. 13 it can be seen that when the rollers 76 of the levers 77 cooperate with the rear face 126 of the fixed cam 114, the levers themselves oscillate so as to close the grippers 7. Underneath this face 126 there is provided a segment 127 which normally is lowered and which therefore does not interfere with the rollers 76, but which can be raised and arranged at the same height as the profile of the fixed cam, so as to form an extension of the curvature of this cam, with a consequent delay in closing of the grippers 7 when these, in cooperation with the transfer carousel 4, must remain open so as to allow an empty flask to pass by. 128 denotes the descending face of the rollers 76 in the case of activation of the segment 127. The cam segment 127 is provided with an enlarged base 129 which carries fixed at the bottom a pair of vertical rods 130 sliding in corresponding guiding seats formed in a support 131 fixed laterally at 132 to the column 96, there being fixed to this same support the body of an electromagnet 133 connected via the spindle to a cross-piece which connects to one another the bottom ends of the rods 130 so as to raise or lower the cam segment 127.

From FIG. 10 it can be seen that the flasks held by the grippers 7 of the filling carousel are raised in succession so that their mouths are able to receive the spouts 134 of the product delivery tower 135 (see below), with a travel which is designed to be constant with variation in the size of the flasks and which is the result of cooperation of the wheels 72 of the carriage 71 with an annular double-acting cam 73 coaxially arranged in the carousel and fixed on the base 95. The cam 73 of the filling carousel has a lower part 92 of its profile which prepares the grippers for taking hold of and transferring the flasks from the first and to the second transfer carousel 4, 10, and has a high profile part 93 which prepares the grippers for raising of the flasks so that the delivery spouts 134 of the tower 135 are able to penetrate inside the latter. To ensure that the spouts 134 are able to enter into the flasks of varying size by the amount required in each case, provision is made for suitable axial displacement of the tower 135.

The tower 135 with the flask filling spouts is, for example, of the type described in Italian Patent Application No. B093A 000310 (or U.S. application 08/264,353) in the name of the Applicant. Tower 135 comprises a fixed top part 147 which has joined to it the pipes 148 connected to the metering devices separate from the carousel and to which is connected the shaft 149 coaxially arranged inside the internal tube 101 of the carousel. Shaft 149 may be used for angular fixing of the part 147 and which with its bottom end is connected to axial displacement means which prepare the tower 135 for use, with the spouts 134 at different heights according to the size of the flasks, or for washing and sterilisation. Purely by way of example, as illustrated in FIG. 10, the tower 135 comprises a bottom part 206 which is integral with the structure 107 and which supports, with the possibility of axial displacement and rotational coupling, the top part 207 which houses the spouts 134. The shaft 149 is provided with a tapered upper section on which there rests a helical spring 208 which rests with its other end against the part 207. The shaft 149 has a threaded bottom section 209 which cooperates with a nut 210 rotatably supported by a support 211 fixed to the frame of the machine, the nut being provided, integrally and coaxially, with a toothed pulley 212 connected by means of the associated positive transmission 213 to a geared motor 214 which can be remotely operated via the control panel of the machine. The shaft 149 is prevented from performing rotational movements by fixing to an arm 215 which with the end slide 216 slides on a vertical slide 217 fixed to the cup-shaped element 95. With activation of the actuator 214 it is possible to displace axially the shaft 149 and therefore adjust the heightwise position of the spouts 134 to suit the size of the flasks used in each case.

Coupling between the parts 206 and 207 is such that in the maximum raised position, the part 207 comes up against a stop 218 on the part 206 such that further raising of the shaft 149 causes compression of the spring 208 and corresponding raising of the part 147 with respect to the part 207, for washing and sterilisation of the product delivery tower.

Figure 14:
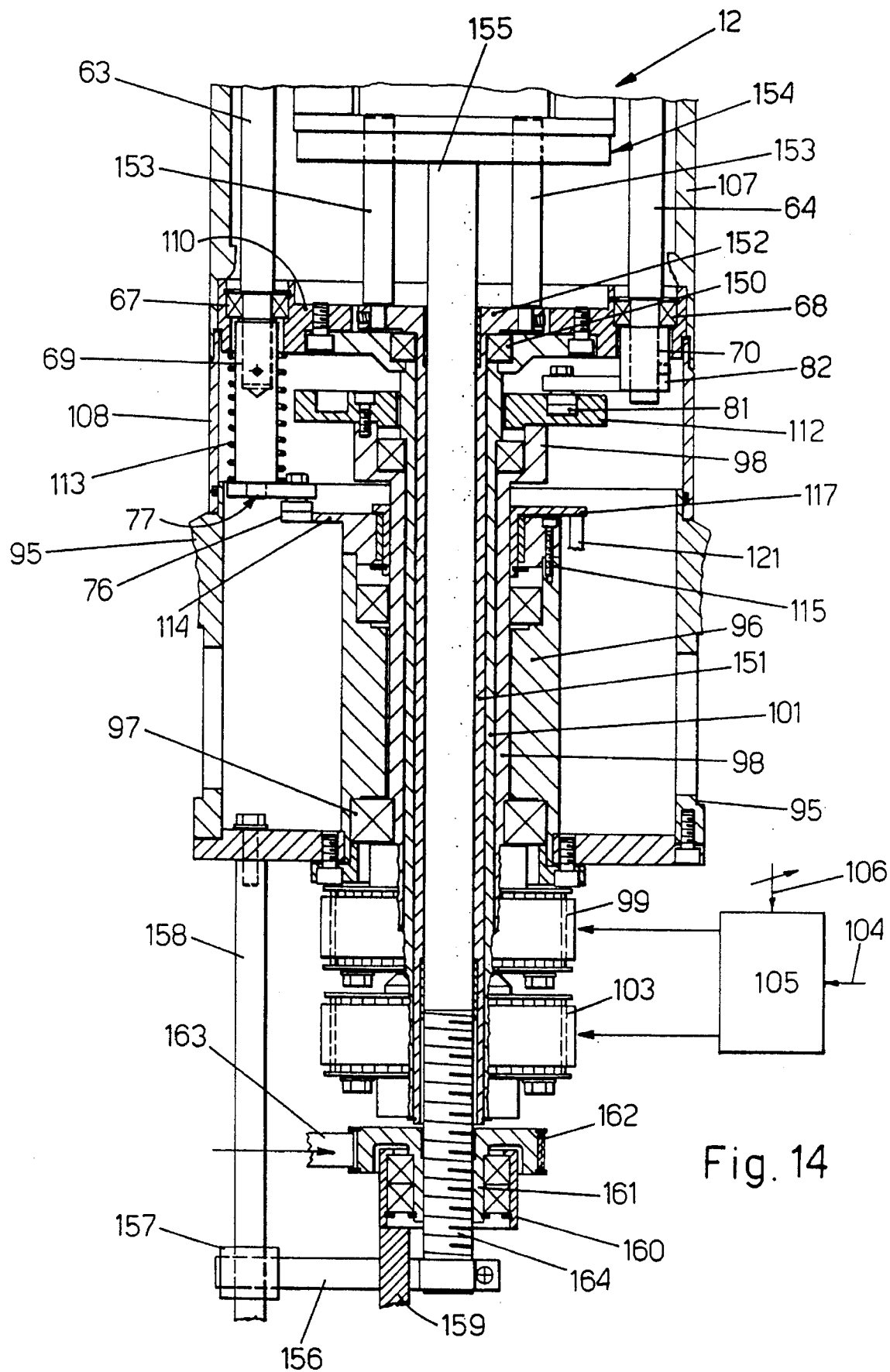
FIG. 14 is a side view, with parts sectioned, of the flask sealing carousel.

FIG. 14 shows the sealing carousel 12, also provided with grippers 7 for holding the flasks by the body, which differs from the filling carousel 8 on account of the following features. The grippers do not perform raising and lowering movements since the flasks rest on underlying supports mounted on the carousel (see below). The gripper-carrying mechanisms therefore end in the region of the hubs of the levers 77 and 82 for effecting opening and closing of the jaws and positioning of the opposition element 35.

The cam operating the levers 77 may not be provided with the segment 127 for prolonging the opening condition of the grippers, illustrated in FIGS. 10 and 13.

Figure 15:
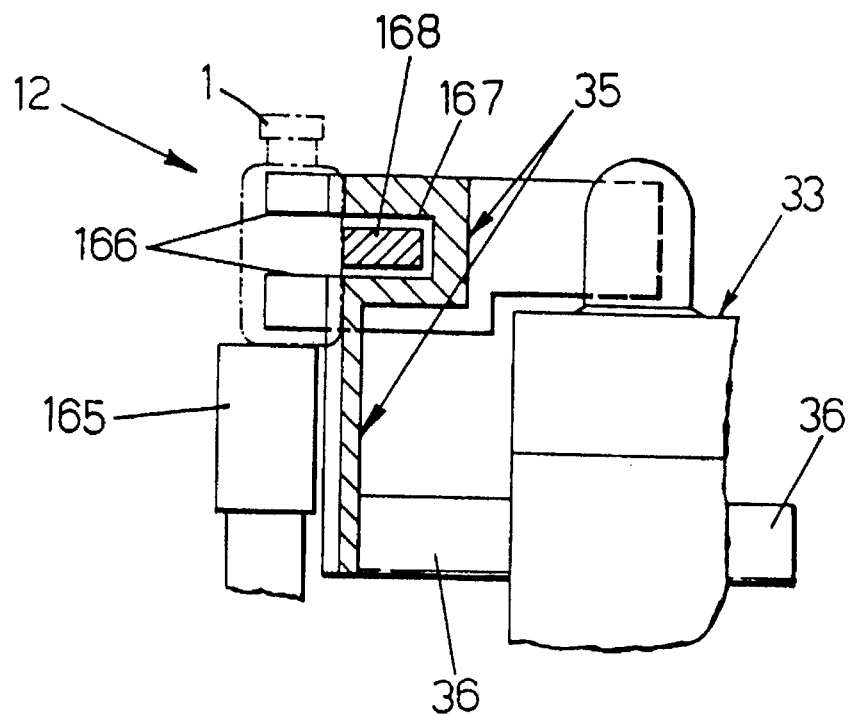
FIG. 15 is a side view, with parts sectioned, of the details relating to the grippers and the opposition elements of the sealing carousel.

Inside the internal tube 101 there is mounted, via bearings 150, an additional tube 151 provided at the top with a flange 152 which has rigidly mounted on it vertical guiding rods 153 on which there slides the base 154 of the drum cam assembly which determines the necessary downward travel for the insertion of the stopper in each flask by the sealing units mounted on the structure 107, 110. The base 154 is integral with the top of a shaft 155 which passes axially through the tube 151. Shaft 155 projects from the latter at the bottom and its bottom end is fixed to an arm 156 provided with a slide 157 which slides on a vertical guiding rod 158 fixed to the bottom of the base structure 95 of the sealing carousel. To another fixed point there is connected by means of the extension 159, the body of a chuck 160 which rotatably supports a nut 161 with a toothed pulley 162 connected by means of a toothed belt 163 and associated pulley to a small geared motor, not shown, which may be operated from the machine's control panel. The nut 161 cooperates with a threaded part 164 of the shaft 155 so as to effect raising of the base 154 of the cam assembly and adjustment of the heightwise position of the sealing units according to the size of the flasks being processed. In FIG. 15, 165 denotes the supports on which each flask 1 is arranged during sealing. From the same figure it can be seen that, contrary to the situation in the filling carousel 8, the jaws of the grippers 7 have a fork-shaped configuration as indicated by 166 and the opposition element 35 has an upper recessed configuration 167 coinciding with the opening of said jaws, i.e. in order to allow the insertion, into these openings and recesses, of a fixed extraction guide 168 which intervenes when the grippers 7 open and the flask is transferred to the unloading unit 18 shown in FIG. 1.

Figure 16:
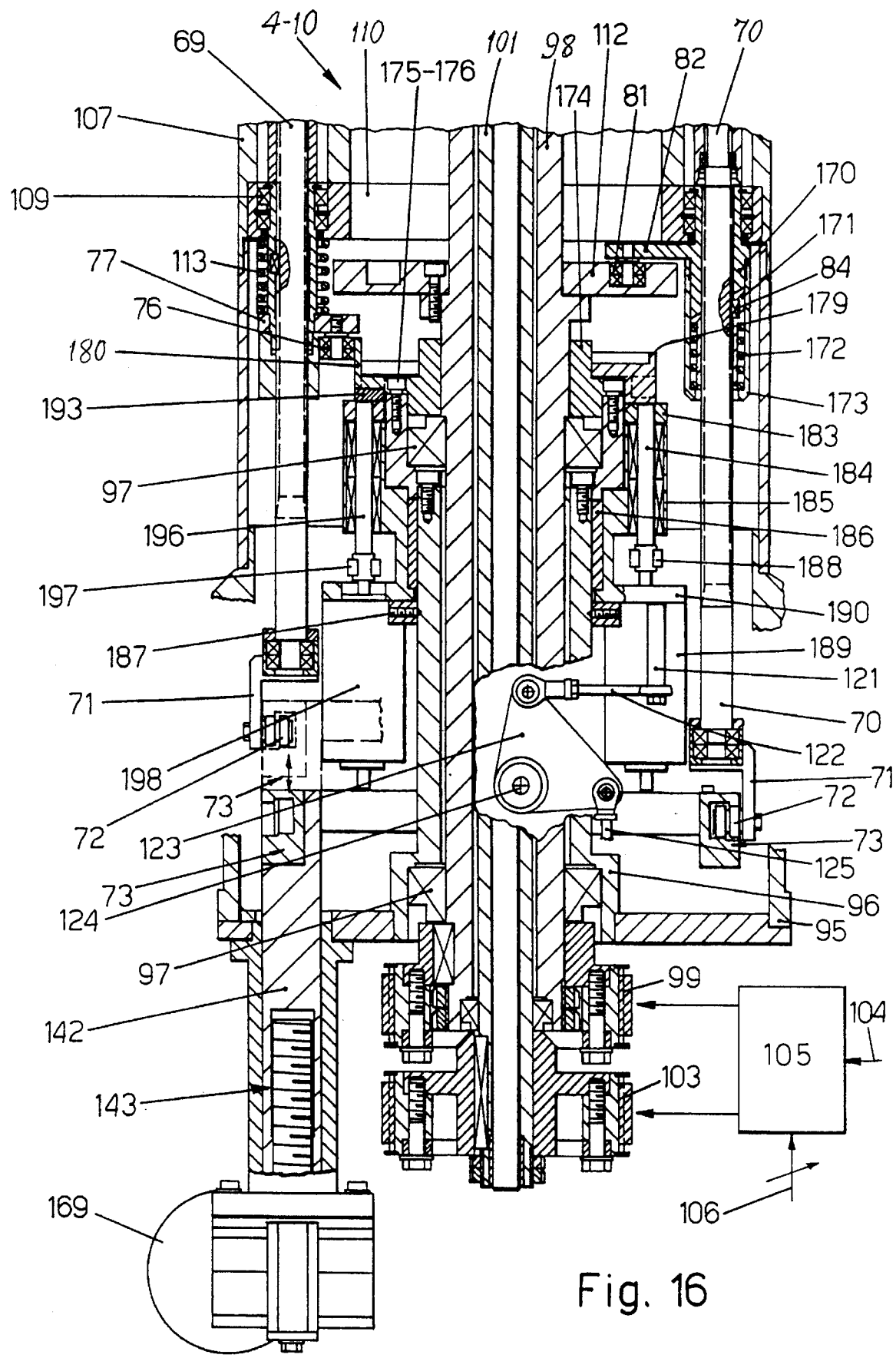
FIG. 16 is a side view, with parts sectioned, of one of the carousels for transferring the flasks.

With reference to FIG. 16, a description is now provided of the transfer carousels which cooperate with the filling carousel and in particular the carousel 4 which supplies the empty flasks to the filling carousel.

The carousel 4 differs from the filling carousel 8 in FIG. 10 in that it does not make provision for the cyclical raising and lowering of the gripper-carrying mechanisms. The wheels 72 of the carriages 71 of these mechanisms slide in a horizontal annular cam 73, the heightwise position may be modified to suit the size of flask being processed, by the connection to the slide 142 connected to a nut-screw assembly 143 actuated by the geared motor 169 which may be remotely activated via the machine's control panel.

Another variant relates to actuation of the levers 82 for operating the opposition elements 35 of the grippers 6. The hub of the levers 82 is freely mounted on the shaft 70 and ends at the bottom in a part 170 with a flute-tip shape which cooperates with a bush with a complementary front profile 171 keyed onto the shaft 70 by means of the cotter 84 or by means of coupling with prism-shaped shafts and pushed upwards by a spring 172 which reacts on the bottom of a lining 173 fixed to the part 170 at the top. The parts 170, 171, 172 form a front coupling which reacts with lowering of the bush 171 when the opposition element 35 of the grippers 6 is pushed in the direction of the body 33 by the flask retained by the rigid opposition element 35 of the grippers 7 which grip it by the body, as already described with reference to FIGS. 2 and 4. When the flask no longer pushes against the opposition element 35, the parts 171 and 170 are coupled together again and the opposition element stops in the rest position relating to the size of flask being procesed.

Since the grippers of the first transfer carousel 4 must be able to cooperate in different opening or closing conditions with regard to the carousel of the weighing unit 24 and with regard to the feeder station 2,3, the cam which causes the opening and closing movements of the grippers 6 of this transfer carousel is different from that of the operating carousels and is now described with reference to FIGS. 16, 18, 19 and 20. The cam in question comprises a collar 174 which surrounds with play the external tube 98 and which has a flange 175 fixed at 176 to the top of the hollow column 96. Flange 175 is provided, in the angular position corresponding to the filling carousel 8 and the unit 2, 3 for supplying empty flasks, with projections 177, 178. Projection 177,178 have rigid with them, respectively, a raised portion 179 in the shape of a "T" and a raised portion 180 in the shape of an upturned "L", both having a curved form, of the same radius, centered on the carousel axis, which form two fixed cam parts with which the upper roller of the rollers 76 of the levers 77 is intended to cooperate for opening the grippers 6. In front of the first fixed cam part 179, underneath the front flange of the latter, there is provided a cam segment 181 which has on its front face a transverse portion 182 which extends as far as the collar 174. These cam parts are integral with a base-piece 183 which carries, fixed at the bottom, a pair of vertical rods 184 sliding on an annular structure 185 mounted rotatably on the column 96, by means of the bush 186, and which is supported for example by segments 187 fixed laterally to the said column. The rods 184 are for example interconnected at their bottom end by means of a small cross-piece 188 fixed to the spindle of a small electromagnet 189 in turn fixed to the bottom flange 190 of the structure 185. Following raising performed by the electromagnet, the cam parts 182 and 181 are in the position illustrated in FIG. 20 by means of continuous lines, such that they are able to be engaged by the lower of the rollers 76 of the levers 77, whereas when these same cam parts are in the lower position,as indicated by the broken lines, said cooperation does not occur.

Figure 18:
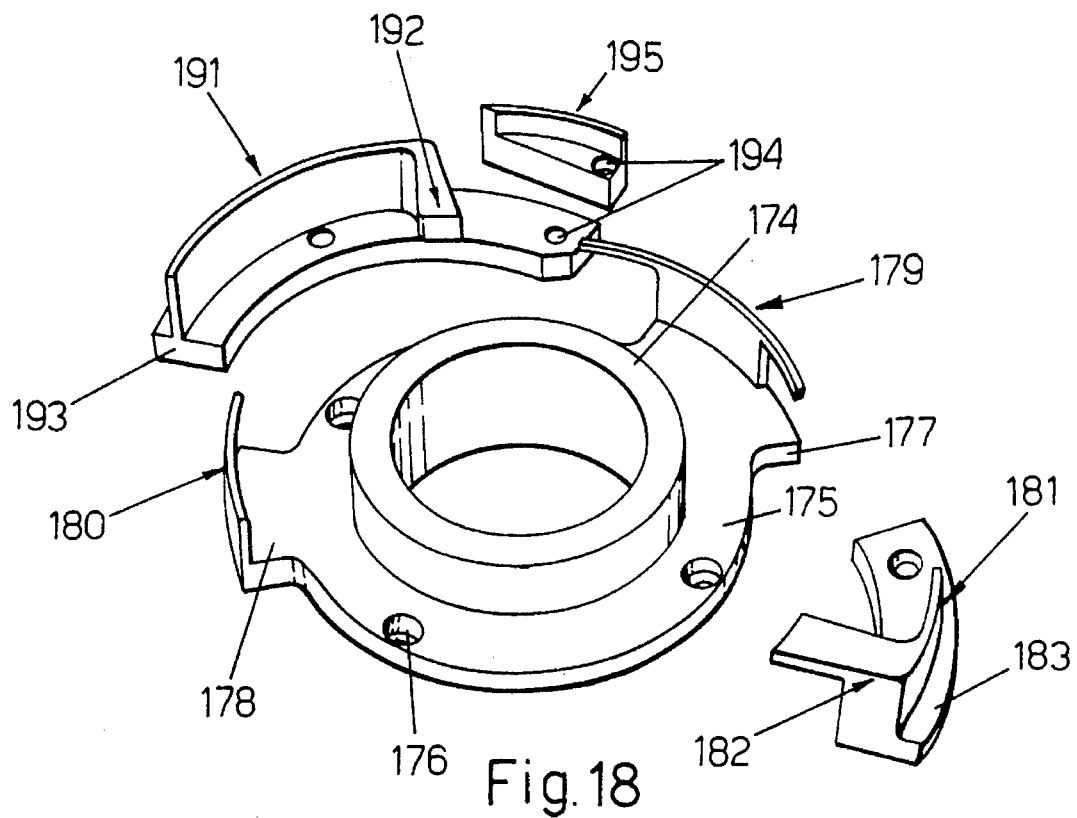
FIGS. 18 and 19 are respectively a perspective view, broken down into its main components, and a plan view from above of the variable-profile cam which controls opening and closing of the grippers of the first transfer carousel.
Figure 19:
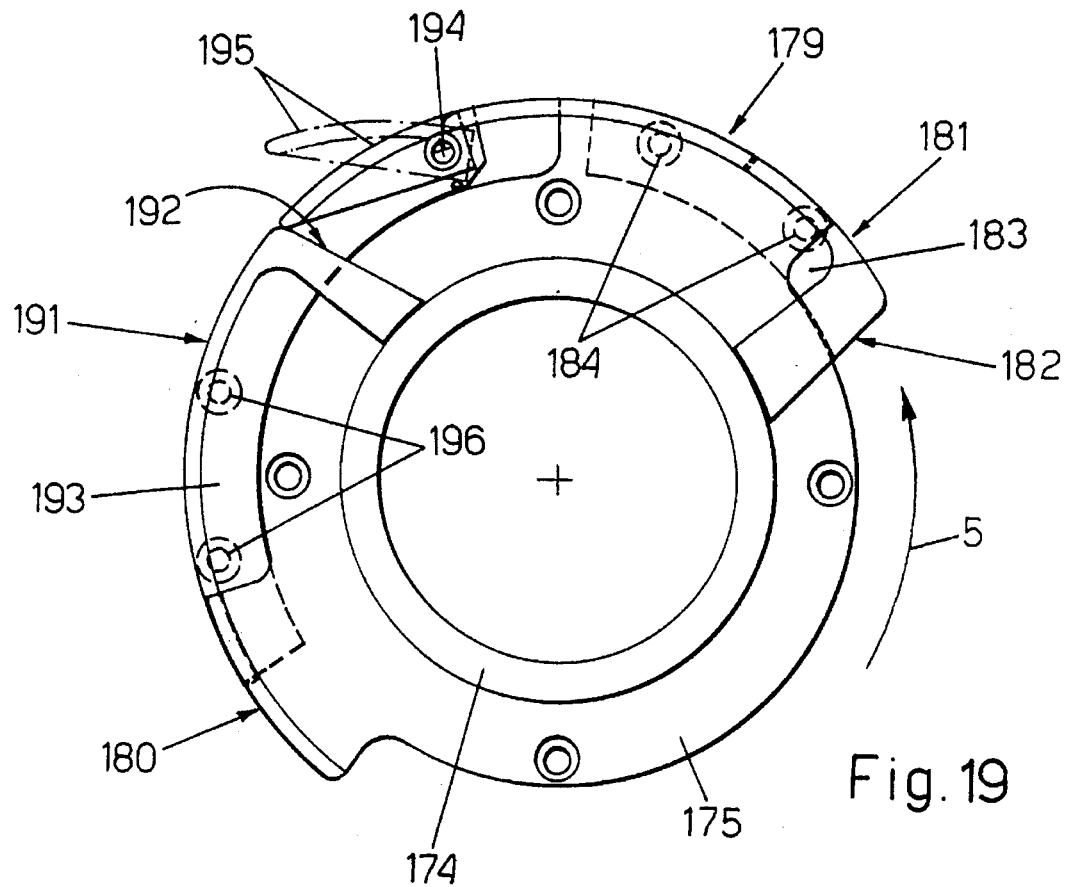

Still with reference to FIGS. 18 and 19, it can be seen that, between the cam parts 179 and 180, there is provided the cam segment 191, with the same curvature, which at one end is positioned underneath the rear flange of the part 180 and which at the other end is integral with a cam part 192 having the same profile and the same function as transverse portion 182 and which, like the latter, is arranged transversely and extends as far as the collar 174 of the fixed cam portions. The cam parts 191 and 192 are fixed to a flat and curved base-piece 193 which extends beyond the part 192 by a certain amount and which carries, articulated on a vertical pin 194, a cam segment 195 which is positioned underneath the rear flange of the part 179 which has the same curvature and which normally rests against the end of the part 191 so as form an extension thereof. The base-piece 193 is also provided so as to be rigid with a pair of vertical and lower rods 196 which pass slidably through the annular structure 185 and which are interconnected at the bottom by a cross-piece 197 fixed to the spindle of an electromagnet 198 integral with the flange 190 of the annular structure. When the assembly of cams 191, 192, 195 is in the raised position, as illustrated by continuous lines in FIG. 20, the assembly cooperates with the lower roller of the rollers 76 of the levers 77, whereas, when it is in the bottom position, as indicated by the broken lines, said cooperation does not occur.

From FIG. 16 it can be seen finally that the bottom flange 190 of the annular structure 185 carries, fixed at the bottom, the rod 121 connected by means of the tie 122 to the right-angled lever 123 pivotably hinged at 124 with the hollow column 96 and connected to the actuating tie 125 which adjusts the angular position of the annular structure 185 and the cam parts 181, 182 and 191, 192, 195 mounted thereon, according to the size of the flasks being processed, so as to modify the opening phase of the grippers 6.

The mode Of operation of the cam thus designed is as follows (see FIGS. 1, 18, 19 and 20). In the normal condition where a flask is taken from the feeder unit 2, 3 and transferred to the filling carousel 8, both the electromagnets 189 and 198 are in the position for raising of the associated cam parts. The rollers 76 of the levers 77, in the direction of movement indicated by the arrow 5, cooperate with the cam parts 182 and 181 which cause opening of the grippers during cooperation with the filling carousel 8, following which the rollers travel externally on the parts 179,195, 191 and 180 and, upon leaving this last cam part, move towards the carousel axis, causing the grippers to close when the latter cooperate with the feeder apparatus, 2, 3, in order to grip an empty flask. When an empty flask must be transferred to the carousel of the weighing unit 24, so that the gripper 6 must open only when opposite this carousel, the first cam parts 181, 182 will be in the bottom position, as indicated by the broken lines in FIG. 20. The gripper involved in this operation remains closed until the rollers 76 of the associated lever 77 enter into cooperation with the cam part 192, causing opening of the oscillating part 195, as shown in broken lines in FIG. 20, following which the rollers travel up onto the part 191 and then continue along the cam part 180. When the rollers 76 travel up onto the cam part 191, the gripper is completely open and closes again when the rollers leave the cam part 180 and the gripper cooperates with the unit 2, 3 supplying an empty flask.

When the empty and weighed flask must be returned to the transfer carousel 4, the pick-up gripper 6 must close during cooperation with the gripper 7 of the carousel of the first weighing unit 24. In this case the set of cams 191, 192, 195 is in the bottom position. The rollers 76 of the lever 77 of the gripper 6 performing gripping of the weighed flask cooperate normally with the cam parts 182, 181, 179 and, upon leaving this last cam part, closure of the gripper commences, the latter gripping the flask released in a synchronised manner by the carousel of the unit 24.

The second transfer carousel 10 differs from the carousel previously considered exclusively on account of the cam which performs closing and opening of the grippers 6. The grippers of this carousel must in fact modify their operation only with regard to the carousel of the weighing unit 28. The cam in question, as illustrated in FIGS. 21 and 22, differs from the one already considered with reference to FIGS. 18, 19 and 20, not only on account of obvious dimensional requirements, but also with regard to the following features.

The base-piece 193 with the cam parts 191, 192 is fixed to the annular structure 185. Immediately upstream of the cam part 195, performing a transfer function, there is provided a cam segment 200 with an end portion 201 which extends towards the carousel axis. The base-piece 199 which supports the assembly 200, 201 is fixed to a pair of vertical rods 202 which slide, guided, through the upper collar of the annular structure 185 and which, at the bottom end, are fixed to a cross-piece 203 connected to the spindle of an electromagnet 204 fixed to the bottom collar 190 of the structure 185. When the cam parts 200, 201 are raised, the lower roller of the rollers 76 of the levers 77 of the carousel 10 cooperates with them. The parts 200, 201 are positioned at the correct distance from the fixed cam part 179 which now has the configuration of an upturned "L".

From FIGS. 1, 21 and 22 it can be seen that when the transfer carousel 10 must transfer the flasks normally to the sealing carousel 12 and then must remove the flasks from the filling carousel 8, the mobile mechanisms of the electromagnets 189 and 204 are both lowered so that the rollers 76 of the levers 77, which rotate in the direction indicated by the arrow 11, cooperate exclusively with the cam part 192 which causes opening of the grippers 6 during cooperation with the grippers 7 of the sealing carousel, after which the rollers cooperate with the cam parts 191 and 180 which keep the grippers open until cooperation with the grippers 7 of the filling carousel. Here, the rollers 76 leave the cam part 180 and the associated grippers 6 of the transfer carousel close in order to grip a flask. During this phase the oscillating part 195 of the cam opens in the position indicated in FIG. 22 by broken lines.

When the transfer carousel 10 has to transfer a flask to the carousel of the weighing unit 28, the cam parts 200, 201 are raised. The gripper 6 of the carousel 10 enters closed into cooperation with the open gripper 7 of the weighing unit, after which the rollers 76 of the lever 77 concerned begin to cooperate with the cam part 201 which causes opening of the gripper which remains open during subsequent cooperation with the part 201 and then with the part 195. The gripper 6 travels past the sealing carousel in the open condition and then performs the normal closing cycle during cooperation with the filling carousel 8. In this way closing of the grippers 6 in the empty condition is avoided, thereby protecting them from undesired stresses. When, on the other hand, the transfer carousel 10 has to pick up a flask from the carousel of the weighing unit 28, the cam parts 181, 182 are raised, while the cam parts 200, 201 are lowered. The rollers 76 of the lever 77 of the pick-up gripper cooperate with the cam part 182 which opens the gripper 6 and brings it in the open condition into cooperation with the gripper 7 of the carousel of the weighing unit 28, after which the rollers cooperate with the cam parts 181 and 179 and, upon leaving the latter, move towards the carousel axis and close the gripper which grips the weighed flask. The arrow 205 indicates the advancing or delaying adjustment which may be made to the cam parts which cause opening of the grippers, with rotation, in both directions, of the annular structure 185 connected to the lever 123 of FIG. 16.

We claim:

1. An automatic machine for filling and closing of containers having necks and bodies comprising:

a supply means for supplying containers to be filled in a single file, one at a time, and in a synchronous manner;

a first transfer carousel having a series of adjustable neck holding grippers which respectively grip by the neck and thus receive each successive container from said supply means;

a filling carousel in which the containers are filled having a series of adjustable body holding grippers which respectively grip by the body and thus receive each successive container from said first transfer carousel, said filling carousel also having a respective filler associated with each said body holding gripper for filling the container held thereby;

a second transfer carousel having a series of adjustable neck holding grippers which respectively grip by the neck and thus receive each successive container from said filling carousel;

a sealing carousel in which the containers are sealed having a series of adjustable body holding grippers which respectively grip by the body and thus receive each container from said second transfer carousel;

a transport means which respectively receives each container from said sealing carousel for transporting the containers away from said sealing carousel, said transport means including a means for sorting correctly filled and sealed containers from containers which are not correctly filled and sealed;

a progressive weighing and sampling means for selectively determining tare and gross weights of successively selected ones of the containers filled by each of said fillers, said sampling means including a first weighing means for determining a tare weight of a selected container, a first sample carousel having an adjustable body holding gripper which periodically grips a selected container from said first transfer carousel and delivers the selected container to said first weighing means, and which then grips the selected container after weighing and delivers the selected container to a predetermined said gripper of said first transfer carousel, a first synchronizing means for causing said supply means to have an empty spot in the single file of containers when the predetermined said gripper of said first transfer carousel gripping the selected container passes said supply means, a second weighing means for determining a gross weight of the selected container after filling, a second sample carousel having an adjustable body holding gripper which periodically grips the selected and now filled container from said second transfer carousel and delivers the selected container to said second weighing means, and which then grips the selected container after weighing and delivers the selected and now filled container to a predetermined gripper of said second transfer carousel, a second synchronizing means for causing said predetermined said gripper of said second transfer carousel to be open and empty when said holding gripper of said second sample carousel delivers the selected container thereto, and a recording means for recording the tare and gross weights of each successively selected container for each said filler.

2. An automatic machine for filling and closing of containers as claimed in claim 1 wherein said carousels define horizontal orbits in which central vertical axes of the containers gripped by associated said grippers of said carousels move, and that each orbit of each receiving said carousel intersects the orbit of each said carousel from which the container is delivered along an intersection trajectory of consecutive said carousels; and wherein each said gripper of each of said carousels includes
   a gripper body,
   a pair of jaws mounted to said gripper body;
   a moving means for moving said jaws with respect to a vertical mid-plane radially extending from said carousel between an opened position and a closed position,
   a vertical opposition element having an outer concave end which is located at a position along the mid-plane and radially between ends of said jaws and said gripper body, the position of said opposition element being determined by a size of the container, a slide supported for radial movement by said gripper body on which said opposition element is mounted, an elastic means for urging said slide and hence said opposition element away from said gripper body, and a third synchronizing means for aligning opposition elements of consecutive said carousels along the intersection trajectory so that the container is elastically held by the opposed opposition elements while said gripper of the delivering said carousel is opened and said gripper of the receiving carousel is closed.

3. An automatic machine for filling and closing of containers as claimed in claim 2 wherein each said body holding gripper also includes a locking means for locking said slide in a predetermined position so that the position of the associated said opposition element is maintained at a predetermined position selected according to the size of the containers.

4. An automatic machine for filling and closing of containers as claimed in claim 2 wherein each jaw of said pair of jaws of said body holding grippers includes (a) a flat proximal portion oriented vertically and hinged on a vertical axis to said gripper body and (b) a flat end section which is directed toward the mid-plane such that the end sections engage portions of the container found outside of the associated orbit and thus urge the container against the associated said opposition element.

5. An automatic machine for filling and closing of containers as claimed in claim 2 wherein each jaw of said pair of jaws of said neck holding grippers includes (a) a proximal portion hinged on a vertical axis to said gripper body and (b) an end part with a face which is directed toward the mid-plane which has an open V-shape in plan view for engaging the necks of containers of various diameters; and wherein said opposition element of said neck holding grippers is located vertically below said jaws and at a height with a portion horizontally opposite a portion of said opposition elements of said body holding grippers.

6. An automatic machine for filling and closing of containers as claimed in claim 1:

(a) wherein each said carousel includes a carousel body which is vertically adjustable, carousel wheels attached to said carousel body, an annular, static, double-acting carousel cam in which said wheels ride and which thereby determines a height of said carousel body, levers attached to said carousel body having respective hubs, said levers being rotatably supported by said carousel body, a lever cam which surrounds said carousel, and a lever roller mounted to each said lever which engages said lever cam to rotate the associated said hub; and (b) wherein each said gripper of each associated said carousel includes a gripper body having a radial eyelet, a first vertical tube and a second vertical tube to which said gripper body is attached at a top of said tubes, first and second seats in the carousel body of the associated said carousel in which said first and second tubes are respectively mounted for guided axial movement, first and second shafts coaxially and rotatably mounted respectively in said first and second tubes, each said shaft having a bottom end which extends from said tubes and which is fixed to the carousel body of the associated said carousel such that the height of said carousel body also determines a height of each said gripper of the associated said carousel, and each said shaft also passing though a respective said hub of a respective said lever of said carousel and being mounted in said hub for axial displacement but against rotational displacement so that movement of an associated said hub rotates said shaft, a pair of hollow spindles which are rotatably mounted in an internal and upper portion of said gripper body, each said hollow spindle having an open top and a toothed segment, said toothed segments of said pair of spindles engaging one another so that rotation of one said spindle results in rotation of the other said spindle, and one of said pair of spindles being non-rotatably connected to said first shaft whereby rotation of said first shaft causes rotation of pair of spindles, a pair of jaws members, each said jaw member including a head, a jaw connected to said head, and a shank connected to said head which is removably and non-rotatably received in a respective said open top of an associated said spindle, a crank non-rotatably mounted to said second shaft in said gripper body and having a longitudinal eyelet, and a slide supported for radial movement by an integral block and a block guide in said gripper body, said slide including an opposition element for engagement with the container, and a vertical pin which passes through said longitudinal eyelet of said crank and said radial eyelet of said gripper body whereby rotation of said second shaft causes radial movement of said opposition element.

7. An automatic machine for filling and closing of containers as claimed in claim 6 wherein each said hub of said transfer carousels through which said second shaft passes includes:

a bottom end having flute tip, a bush keyed to said second shaft and having a front face complementary to and immediately adjacent said flute tip of said bottom end, a hub housing fixed to said bottom end and extending downwardly about said bush, and a spring located between said hub housing and said bush for biasing said bush upwards.

8. An automatic machine for filling and closing of containers as claimed in claim 6:

(a) wherein each said jaw member includes an annular recess provided in said shank, and an upper portion with a prism-shaped cross section; and (b) wherein each said spindle includes a seat opposite a respective said annular recess, a spring loaded sphere mounted in said seat for releasably engaging in said annular recess adjacent thereto to hold said jaw member in said open top of said spindle, and an upper part having a prism-shaped cross section which complementarily receives said upper portion of the associated said jaw.

9. An automatic machine for filling and closing of containers as claimed in claim 6:

(a) further including a main drive source which drives all of said carousels; and (b) wherein each said carousel further includes:
a vertical and hollow column having a top to which said lever cam is attached and a bottom,
a horizontal carousel base,
a cup-shaped structure attached to said carousel base and having a base portion to which said bottom of said column is fixed,
a third tube mounted rotatably in said column and having a bottom which extends below said carousel base and a top to which is keyed said lever cam,
a fourth tube mounted rotatably in said third tube having a bottom which extends below said carousel base and a top which supports said carousel body,
a respective positive-movement transmission means for connecting respective said bottoms of said third and fourth tubes to said main drive source, and
a phase variator located between said main drive source and said positive-movement transmission means for phase-adjusting the drive to said third and fourth tubes from said main drive source.

10. An automatic machine for filling and closing of containers as claimed in claim 9:
(a) wherein each said carousel includes a needle spring which biases an associated said hub towards an axis of said carousel to urge associated said jaw members toward a closed position; and
(b) wherein said lever cam of said filling carousel includes
a fixed cam part fixed to said hollow column,
a mobile cam part rotatably attached relative to said fixed cam part and forming an ascending portion relative thereto, and
an adjusting means for adjusting the angular position of said mobile cam part relative to said fixed cam part to accommodate different sizes of flasks.

11. An automatic machine for filling and closing of containers as claimed in claim 10 wherein said lever cam further includes:
a cam segment located immediately downstream of a descending face of said fixed cam part which is movably mounted between an engaging position where said cam segment is at a same level as said fixed cam part and a lowered position,
a pair of vertical rods attached to said cam segment, said vertical rods being supported slidably and fixed laterally to said hollow column, and
a moving means for moving said vertical rode to move said cam segment between the engaging and lowered positions whereby when said cam segment is in the engaging position associated said jaw members are maintained in an open position when said jaw members are not required to engage a container.

12. An automatic machine for filling and closing of containers as claimed in claim 9 wherein said lever cam for said first transfer carousel includes:
a collar part which is fixed to said hollow column supporting said first transfer carousel,
a first cam segment attached to said collar part for effecting opening of associated said grippers, said first cam segment including a front flange and a rear flange,
a second cam segment attached to said collar part and spaced from said first cam segment which also effects opening of the associated said grippers,
a first base-piece including (a) a third cam segment provided underneath of said front flange of said first cam segment, and (b) a first ascending face located transversely and towards a carousel axis of said first transfer carousel,
a first base-piece rotating means for rotating said first base-piece about the carousel axis and hence said third cam segment relative to said front flange of said first cam segment in order to accommodate earlier or later opening of the associated said grippers in accordance with the container being transferred,
a first base-piece moving means for raising and lowering said first base-piece relative to said first cam segment whereby in a raised position the associated said lever rollers engage said first ascending face, said third cam segment and said first cam segment to open the associated said grippers and transfer containers held thereby to said filling carousel while in a lower position the associated said lever rollers do not engage said first ascending face, said third cam segment and said first cam segment and thus the associated said grippers continue past said filling carousel in a closed position and without transferring a container,
a second base-piece including
(a) a fourth cam segment provided underneath of said rear flange,
(b) a vertical pin integral with said second base-piece which mounts said fourth cam segment for oscillation on said second base piece,
(c) a fifth cam segment which extends from said fourth cam segment to said second cam segment, and
(d) a second ascending face located transversely and towards a carousel axis of said first transfer carousel provided at an intersection of said fifth cam surface and said fourth cam segment,
a second base-piece rotating means for rotating said second base-piece about the carousel axis and hence said fourth and fifth cam segments relative to said rear flange of said first cam segment in order to accommodate earlier or later closing of the associated said grippers in accordance with the container being transferred, and
a second base-piece moving means for raising and lowering said second base-piece relative to said second cam segment whereby (a) in a raised position (i) where the associated said lever roller engages said second ascending cam face while the grippers are in the closed position, the associated said lever roller engages said fifth cam segment so that the container carried thereby is delivered to said first weighing means, and (ii) where the associated said lever roller engages said fourth cam segment while the grippers are in the open position, the associated said lever roller engages said fourth and fifth cam segments and then said second cam segment so that the associated grippers are maintained in the open position until said supply means is reached, and (b) in the lowered position the associated said lever roller of the associated said gripper which is in the open position does not engage said second base piece so that the open gripper closes on a container in said first weighing means upon leaving said rear flange of said first cam segment.

13. An automatic machine for filling and closing of containers as claimed in claim 9 wherein said lever cam for said second transfer carousel includes:
a collar part which is fixed to said hollow column supporting said second transfer carousel,
a first cam segment attached to said collar part for effecting opening of associated said grippers, said first cam segment including a front flange,
a second cam segment attached to said collar part and spaced from said first cam segment which also effects opening of the associated said grippers and which includes a front flange, a first base-piece including (a) a third cam segment provided underneath of said front flange of said first cam segment, and (b) a first ascending face located transversely and towards a carousel axis of said first transfer carousel, a base-piece rotating means for rotating said first base-piece about the carousel axis and hence said third cam segment relative to said front flange of said first cam segment in order to accommodate earlier or later opening of the associated said grippers in accordance with the container being transferred, a first base-piece moving means for raising and lowering said first base-piece relative to said first cam segment whereby in a raised position the associated said lever rollers engage said first ascending face, said third cam segment and said first cam segment to open the associated said grippers upon approach to a container in said second weighing means and thereafter after traveling past said first first cam segment to close on the container in said second weighing unit and to remove the container from said second weighing means, while in a lower position the associated said lever rollers do not engage said first ascending face, said third cam segment and said first cam segment and thus the associated said grippers continue past said second weighing means in a closed position and without removing a container, a second base-piece fixed to said base-piece rotating means for rotation together with said first base-piece by said base-piece rotating means, said second base-piece including (a) a fourth cam segment spaced from said first cam segment, (b) a vertical pin integral with said second base-piece which mounts said fourth cam segment for oscillation on said second base piece, (c) a fifth cam segment which extends from said fourth cam segment to said front flange of said second cam segment, and (d) a second ascending face located transversely and towards a carousel axis of said second transfer carousel provided at an intersection of said fifth cam surface and said fourth cam segment, whereby when the associated lever roller of the grippers which are closed engage said second ascending face the associated grippers are opened for delivery of a container to said sealing carousel, a third base-piece fixed to said base-piece rotating means for rotation together with said first base-piece and said second base-piece by said base-piece rotating means, said third base-piece including (a) a sixth cam segment which extends from said fourth cam segment back toward said first cam segment but which is spaced from said first cam segment, and (b) a third ascending face located transversely and towards a carousel axis of said second transfer carousel provided at a beginning of said sixth cam surface, and a second base-piece moving means for raising and lowering said third base-piece relative to said second cam segment whereby when said third base-piece is in the raised position the associated said lever roller engages said third ascending face and said sixth cam surface to open the associated said gripper and deliver a container to said second weighing means and when said third base piece is in the lowered position said lever rollers are not engaged.

14. An automatic machine for filling and closing of containers as claimed in claim 12:

(a) wherein said first and second rotating means each include
an annular structure rotatably mounted to a top lateral part of an associated said hollow column,
a servo control device controlled by a master controller of the machine, and
a transmission means, connected between said servo control device and said annular structure and supported by said hollow column, for transmitting a turning movement to said annular structure upon receipt of a control signal by said servo control device from the master controller; and (b) wherein said first and second base moving means each include
respective vertical guides fixed to said annular structure on which respective said cam segments are mounted, and
respective actuating electromagnets fixed to said annular structure which raise and lower respective said vertical guides.

15. An automatic machine for filling and closing of containers as claimed in claim 13

(a) wherein said first and second rotating means each include
an annular structure rotatably mounted to a top lateral part of an associated said hollow column,
a servo control device controlled by a master controller of the machine, and
a transmission means, connected between said servo control device and said annular structure and supported by said hollow column, for transmitting a turning movement to said annular structure upon receipt of a control signal by said servo control device from the master controller; and (b) wherein said first and second base moving means each include
respective vertical guides fixed to said annular structure on which respective said cam segments are mounted, and
respective actuating electromagnets fixed to said annular structure which raise and lower respective said vertical guides.

16. An automatic machine for filling and closing of containers as claimed in claim 6 wherein each said transfer carousel includes:

facing tracks of said double-acting carousel cam between which said carousel wheels ride, said facing tracks being coaxial with a carousel turning axis, and a positioning means for adjusting a height of said carousel cam, said position means including respective screw-nut mechanisms connected between said carousel cam and a base structure and respective servo control devices which actuates respective said screw-nut mechanisms in response to a signal from a machine control device.

17. An automatic machine for filling and closing of containers as claimed in claim 6:

wherein said filling carousel includes facing tracks of said double-acting carousel cam between which said filling carousel wheels ride, said facing tracks being coaxial with a filling carousel turning axis and including a lower part which brings associated said grippers into position for transferring containers from said first transfer carousel and after filling to said second transfer carousel, and an upper part which causes the associated said grippers to be raised upwards and thus to raise the container held thereby toward a respective said filler of said filling carousel.

18. An automatic machine for filling and closing of containers as claimed in claim 17:

wherein said filling carousel further includes an adjusting means for vertically adjusting the positions of said fillers in accordance with the containers being filled, said adjusting means including a mounting shaft centrally provided in said filling carousel body, a product delivery tower which includes said fillers mounted to a top of said mounting shaft, and a servo control means attached to a bottom of said mounting shaft for moving said mounting shaft vertically to position said product delivery tower.

19. An automatic machine for filling and closing of containers as claimed in claim 9 wherein said sealing carousel includes:

(a) a sealing means for sealing each filled container including a drum cam and sealing heads vertically positioned by said drum cam; and (b) an adjusting means for vertically adjusting a position of said sealing means relative to said grippers of said sealing carousel, said adjusting means including a flange element, a fifth tube mounted rotatably in said fourth tube and having a top supporting said flange element, vertical guide rods attached to said flange element and extending thereabove to support said drum cam, a third shaft slidably mounted in said fifth tube, said third shaft having a bottom projecting end and a bottom section which is threaded, a vertical guiding rod attached to said carousel base and extending parallel to said third shaft and adjacent said bottom end thereof, an arm fixed to said bottom projecting end and extending to said vertical guiding rod, a bush which mounts said arm for vertical sliding movement to said vertical guiding rod, a nut which engages said threaded bottom section of said third shaft, a chuck in which said nut is rotatably mounted, a mounting means for mounting said chuck non-rotatably relative to said arm, a rotating means for reversibly rotating said nut whereby said third shaft is moved vertically up or down, and a servo control device which actuates said rotating means in response to a signal from a machine control device.

20. An automatic machine for filling and closing of containers as claimed in claim 6 wherein said sealing carousel includes:

a resting means on which an associated container rests as the associated container is sealed;

wherein said jaws are each fork-shaped with a vertical recess; and further including a fixed guide means located in said recess for unloading the sealed containers from said sealing carousel to said transport means.

* * * * *